(12) United States Patent
Bennett

(10) Patent No.: US 8,072,976 B2
(45) Date of Patent: Dec. 6, 2011

(54) PACKET ROUTING AND VECTORING BASED ON PAYLOAD COMPARISON WITH SPATIALLY RELATED TEMPLATES

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/564,125

(22) Filed: Sep. 22, 2009

(65) Prior Publication Data

US 2010/0008360 A1 Jan. 14, 2010

Related U.S. Application Data

(63) Continuation of application No. 11/429,478, filed on May 5, 2006, now Pat. No. 7,596,137.

(51) Int. Cl.
*H04L 12/28* (2006.01)
(52) U.S. Cl. ....................................... 370/389
(58) Field of Classification Search .................. 370/389, 370/400, 352
See application file for complete search history.

(56) References Cited

U.S. PATENT DOCUMENTS

| | | | |
|---|---|---|---|
| 6,195,698 B1 | 2/2001 | Lillibridge | |
| 6,393,568 B1 | 5/2002 | Ranger | |
| 6,466,591 B1 * | 10/2002 | See et al. | ........................ 370/535 |
| 2002/0007453 A1 | 1/2002 | Nemovicher | |
| 2002/0032880 A1 | 3/2002 | Poletto et al. | |
| 2002/0069370 A1 | 6/2002 | Mack | |
| 2002/0129140 A1 | 9/2002 | Peled | |
| 2002/0129237 A1 | 9/2002 | Radatti | |
| 2003/0172262 A1 | 9/2003 | Curry | |
| 2005/0050338 A1 | 3/2005 | Liang | |
| 2005/0050362 A1 | 3/2005 | Peles | |
| 2005/0210533 A1 | 9/2005 | Copeland | |
| 2005/0238005 A1 | 10/2005 | Chen et al. | |

(Continued)

FOREIGN PATENT DOCUMENTS

EP 1063833 A 12/2000

(Continued)

OTHER PUBLICATIONS

Maya Gokhale et al; "Granidt: Towards Gigabit Rate network Intrusion Detection Technology"; FPL 2002, Montpellier,France.
Dharmapurikar S. et al; "Deep Packet Inspection Using Parallel Bloom Filters"; IEEE MICRO, IEEE Service Center Los Alamitos, CA, US Jan. 2004.

(Continued)

*Primary Examiner* — Man Phan
*Assistant Examiner* — Nourali Mansoury
(74) *Attorney, Agent, or Firm* — Garlick Harrison & Markison; Bruce E. Garlick

(57) ABSTRACT

An Internet infrastructure with network devices and end point devices containing service module manager and service modules, that supports packet routing and vectoring based on payload comparison with spatially related templates. The network device that supports packet content analysis on arriving packet, consists of a plurality of packet switched interface circuitries, user interface circuitry, local storage comprising the service module manager software and a plurality of local service modules, and processing circuitry communicatively coupled to each of the packet switched interfaces, local storage and user interface circuit. The processing circuitry executes service module manager and thus analyzes the packet content and applies one or more selected local service module processing using the packet. The service module manager contains, for comparisons, header templates, spatially related payload trigger templates and spatially related payload supplemental templates. The spatially related templates attempt to identify a target data with certainty. The processing circuitry takes one or more actions on the packet of a target data, by applying selected service modules.

20 Claims, 17 Drawing Sheets

U.S. PATENT DOCUMENTS

| | | |
|---|---|---|
| 2005/0251486 A1 | 11/2005 | Nair |
| 2005/0278784 A1 | 12/2005 | Gupta |
| 2006/0072582 A1 | 4/2006 | Bronnimann |
| 2006/0075494 A1 | 4/2006 | Bertman |
| 2006/0085528 A1 | 4/2006 | Thomas |
| 2006/0092921 A1* | 5/2006 | Narayanan et al. ............ 370/352 |
| 2006/0095971 A1 | 5/2006 | Costea |
| 2006/0174345 A1 | 8/2006 | Flanagan |
| 2006/0248575 A1 | 11/2006 | Levow |
| 2007/0033419 A1* | 2/2007 | Kocher et al. ................. 713/193 |

FOREIGN PATENT DOCUMENTS

| | | | |
|---|---|---|---|
| EP | 1335559 | A | 8/2003 |
| EP | 1560398 | A2 | 1/2005 |
| EP | 1699204 | A | 9/2006 |
| KR | 20040102907 | A1 | 12/2004 |
| WO | 9712321 | A | 4/1997 |
| WO | 0219639 | A | 3/2002 |
| WO | 2004091158 | A | 10/2004 |
| WO | 2005017708 | A | 2/2005 |

OTHER PUBLICATIONS

Steve White, et al; "Anatomy of a Commercial-Grade Immune System"; Internet Citation, Jun. 1999 (XP-002310183).

Young H. Cho, et al; "A Pattern Matching Co-processor for Network Security"; DAC 05; Proceedings of the 42nd Annual Conf. on Design Automation Jun. 13, 2005.

Shanmugasundaram Kulesh et al; "Payload Attribution via Hierarchical Bloom Filters"; Proc ACM Conf Computer Commun Secur; Proceedings of the ACM Conf on Computer & Comm. 2004 (XP002453251).

CISCO; "Committed Access Rate"; Internet Citation 1999 (XP-002375164).

CISCO ISP Essentials; Internet Citation Jun. 6, 2001 (XP-002217477).

David Whyte, et al; "DNS-Based Detection of Scanning Worms in an Enterprise Network";Security Symposium, Feb. 4, 2005 (XP-002412148).

European Search Report; EP Application No. 07000345.4-2413; dated Jan. 8, 2008.

* cited by examiner

Service Module Manager 600

Trigger Logic 601 | Ref_IDs 602

Service Logic 603

Header Trigger Templates 621 | Ref_IDs 622 | Field IDs 623 | Comparison Templates 624 | Operator 625 | TL_Ref 626

Spat'ly Related Payload Trigger Temp's 614 | Ref_IDs 615 | Comparison Templates 616 | Operator 617 | TL_Ref 618

Header Supp'l Templates 671 | Ref_IDs 672 | Field IDs 673 | Comparison Templates 674 | Operator 675

Spat'ly Related Payload Supp'l Temp's 685 | Ref_IDs 686 | Comparison Templates 687 | Operator 688

FIG. 6

Service Module Manager 700

| | | |
|---|---|---|
| Trigger Logic 701 | TL_1 704 | {{ If (NOT HS_1) then Local_SM_8 else Remote_SM_2 }} 705 |
| | TL_2 706 | {{ If (HS_1 AND (PS_1 OR PS_2 OR PS_3)) then Remote_SM_6 }} 707 |
| | TL_3 708 | {{ If NOT (PS_1 OR PS_2 OR PS_3)) then Remote_SM_8 }} 709 |

| HTTs 721 | HT_1 728 | Destinat'n 729 | 1st Target's IP Address 730 | Equals 731 | TL_1 732 |
|---|---|---|---|---|---|

| | | | | |
|---|---|---|---|---|
| SRPTTs 741 | PT_1 746 | << SR Group A: 1st Bit Sequence Template >> 747 | Equals 748 | TL_2 749 |
| | PT_2 750 | << SR Group A: 2nd Bit Sequence Template >> 751 | Equals 752 | TL_2 753 |
| | PT_3 756 | << SR Group B: 1st Bit Sequence Template >> 757 | Equals 758 | TL_3 759 |
| | PT_4 760 | << SR Group B: 2nd Bit Sequence Template >> 761 | Equals 762 | TL_3 763 |

| HSTs 771 | HS_1 776 | QoS 777 | Target QoS Word 778 | Greater 779 |
|---|---|---|---|---|

| | | | |
|---|---|---|---|
| SRPSTs 785 | PS_1 786 | << SR Group C: 1st Bit Sequence Template >> 787 | Equals 788 |
| | PS_2 790 | << SR Group C: 2nd Bit Sequence Template >> 791 | Equals 792 |
| | PS_3 796 | << SR Group C: 3rd Bit Sequence Template >> 797 | Equals 798 |

FIG. 7

PACKET ROUTING AND VECTORING BASED ON PAYLOAD COMPARISON WITH SPATIALLY RELATED TEMPLATES

CROSS-REFERENCE TO PRIORITY APPLICATION

The present application is a continuation of, and claims priority to U.S. patent application Ser. No. 11,429,478, filed May 5, 2006, and now issued as U.S. Pat. No. 7,596,137, which is incorporated herein in its entirety for all purposes

BACKGROUND OF THE INVENTION

1. Field of the Invention

This invention generally relates to communication systems.

2. Related Art

Internet has rapidly become widespread among population because of its ability to traffic audio, video, data packets at increased speeds. Internet infrastructure typically includes network devices such as routers, switches, packet switched exchanges, access points and Internet service provider's networks (ISPN), Internet communication pathways and end point devices. The end point devices include personal or laptop computers, servers, set top boxes, handheld data/communication devices and other client devices, for example. All these end point devices residing in remote locations exchange audio, video, and data packets using any available Internet communication pathway.

Various remote and local services relating to communicated data are available to conventional end-point devices. Typically, an end-point device analyzes received data to determine if such services are warranted. Before performing such analysis on packetized, received data, the end-point device first reconstructs the packets (desegments) and stores the reconstructed data locally. If analysis of the reconstructed data so indicates, the end-point device will deliver the reconstructed data to the local or remote service—a process that often requires resegmentation and retransmission (for a remote service). This process often results in wasted communication, local storage, local processing and routing infrastructure resources. Moreover, even if the end-point device should perform such analysis and delivery, it need not do so to thwart a highly desired service. This applies to both source and destination end-point devices, which may be, for example, client devices and servers.

Typically, the exchange of audio, video and data packets via the Internet happens without any internal control over the packets, other than the network devices routing the packets from a source end point device to one or more destination end point devices. In other words, typical packet flow in an Internet infrastructure is unrestrained. Though such free flow of packets is usually beneficial, some packets, inadvertently or deliberately, may contain disruptive content (e.g., virus, worms or other malware), unauthorized content (e.g., pirated copies of video, audio, text or program code), unwanted content (e.g., pornography or adult themes), or unsuitable content (e.g., content unlikely to benefit a particular region because of customs, regional constraints, or language limitations). Conventional end point devices have the burden of restraining presentation or execution of such disruptive, unauthorized, unwanted and unsuitable content. Often, however, such end point devices are incapable of doing so. For example, even with malware protection software active, end point devices are often infected. With blocking software installed, pornography is still displayed to children. Other types of filters blocking such types of content also fail with undesirable results.

A target data, from a packet of any of the above mentioned target data or files is not easily identified by analyzing payload portions of the segmented packet because of arbitrary lengths of the packets.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, an Internet infrastructure with network devices and end point devices containing service module manager and service modules, that supports packet routing and vectoring based on payload comparison with spatially related templates. The infrastructure consists of a plurality of end point devices that receive and transfer data (that includes target data), plurality of switching devices. The switches consist of a plurality of ports that receive the packet, perform payload analysis, encapsulation and service module vectoring on the packet and forward along at least one of the ports. The switching device, while performing the analysis of the packet, compares payload portion of the packet with a plurality of spatially related payload trigger templates. That is, by segmenting payload templates into a plurality of spatially related payload trigger templates, the switching device attempts to identify with certainty the target data trafficking via the switching device, irrespective of the target data segmentation. Based upon matches during comparison, the switching device applies trigger logic, and encapsulation and service module vectoring.

In accordance with the present invention, a network device, having a plurality of ports, consisting of a plurality of packet switched interface circuitries, user interface circuitry, local storage that includes service module manager and a plurality of local service modules and processing circuitry. The service module manager analyzes the packet content and by analyzing the packet content, the service module manager compares payload portion of the packet a plurality of spatially related payload templates. Based upon matches during comparison, the service module manager applies trigger logic, and encapsulation and service module vectoring.

Features and advantages of the present invention will become apparent from the following detailed description of the invention made with reference to the accompanying drawings.

BRIEF DESCRIPTION OF THE DRAWINGS

FIG. 6 is a schematic diagram illustrating an embodiment of trigger logic, header trigger templates and payload trigger templates incorporated into service module managers (SMM) of FIGS. 2 and 4;

FIG. 7 is another schematic diagram illustrating in detail an embodiment of trigger logic, header trigger templates and payload trigger templates of FIG. 6;

DETAILED DESCRIPTION OF THE INVENTION

Figure 1:
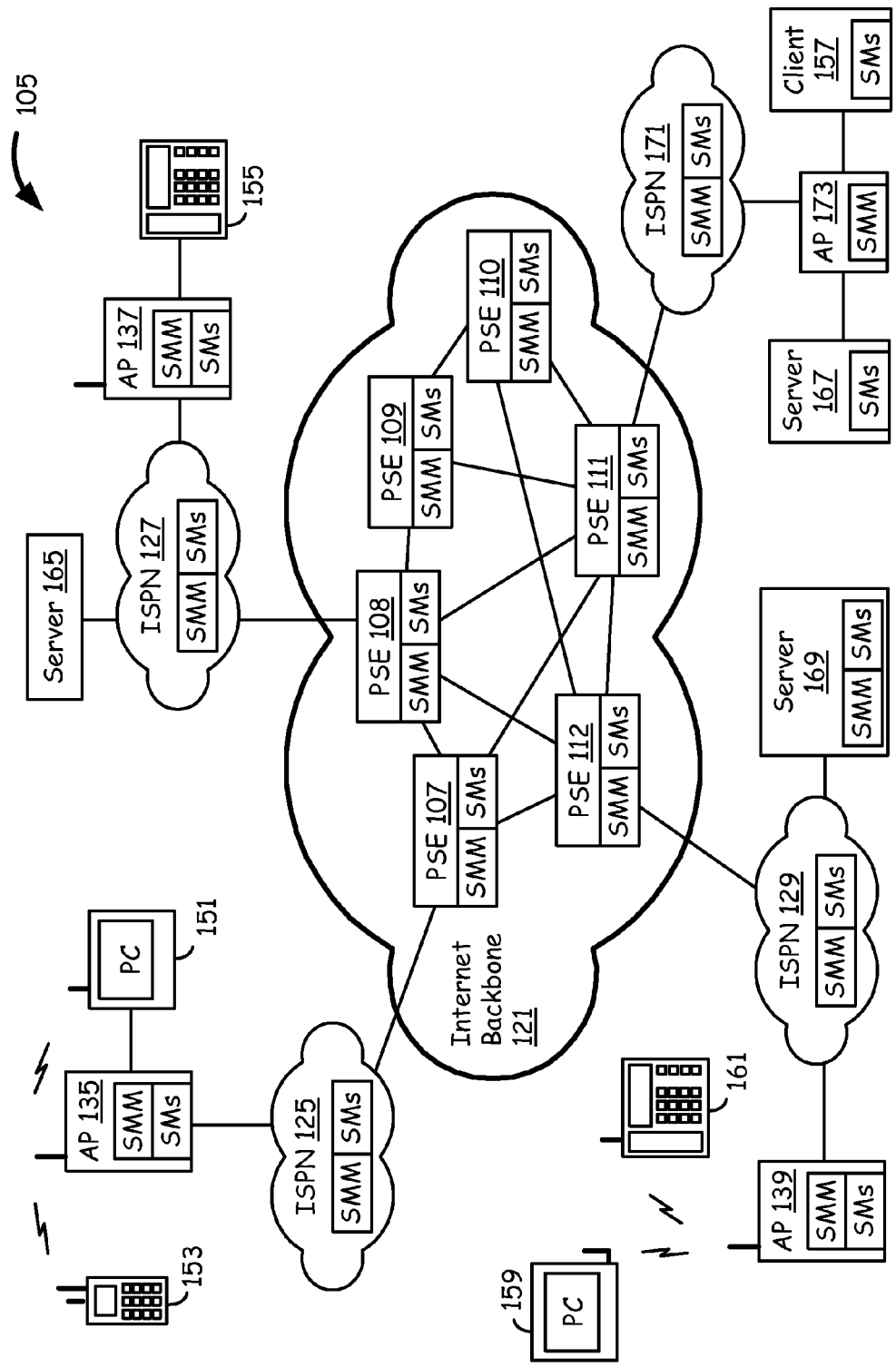
FIG. 1 is a schematic block diagram of an Internet infrastructure containing network and end point devices according to the present invention, that supports packet routing with payload analysis that includes spatially related payload template comparison, encapsulation and service module vectoring.

FIG. 1 is a schematic block diagram of an Internet infrastructure containing network and end point devices according to the present invention that supports packet routing with payload analysis that includes spatially related payload template comparison, encapsulation and service module vectoring. The internet infrastructure 105 typically consists of an Internet backbone 121, which routes packets from a source end point device to a destination end point device. The Internet backbone 121 includes packet switching exchanges (PSEs) 107 through 112, which process the analyze packet content, encapsulate, perform service module vectoring, if indicated and forward the packet accordingly to a next PSE or to Internet service provider's network (ISPN) 125, 127, 129 or 171. The analysis of packet contents include identification of target data using spatially related payload trigger templates, as described below. The target data inadvertently or deliberately may contain concealed disruptive codes such as virus, worms or Trojan horse. Here, the unrelated and spatially related trigger templates in the SMM, which consists of unrelated and spatially related bit sequence, attempt to increase the probability of identifying the disruptive codes. Alternatively, the segmented packets of target data may contain independent requests that prompt the SMM to take certain predefined action such as not allowing the target data to reach certain regions or locations. The packets from ISPN 125, 127, 129 or 171 are further routed to the destination end point devices 151, 153, 155, 157, 159 or 161, via access points (APs) 135, 137, 139 or 173. Further, any of the end point devices 151, 153, 155, 157, 159, or 161 may also be the source devices from which packets originate. An Internet infrastructure 105 may also contain servers 165, 167 or 169 attached to the ISPNs 125, 127, 129 or 171, from which the packets may either originate or conclude.

In accordance with the present invention, each of the PSEs 107 through 112, ISPNs 125, 127, 129 and 171, APs 135, 137, 139 and 173 and some of the servers 165, 167 and 169 and end point devices 151, 153, 155, 157, 159 and 161, in various capacities, incorporate service module managers (SMMs) and service modules (SMs). The SMMs in the routing and switching devices of Internet infrastructure 105 analyze the packets by comparing against spatially related payload templates and header trigger templates, and apply one or more of SM processing, before forwarding to a next device or discarding the packets. The SMMs further contain various trigger logic, which are conditional statements that determine selection of appropriate SMs.

The spatially related payload templates are payload trigger templates that are segmented into two or more trigger templates. One group of spatially related payload templates may consist of a plurality of bit sequences, such that the bit sequences from one related template to the next are sequential. For example, a group of spatially related payload template may consist of sequences of bits from a target data segmented into two or more contiguous bit sequences. That is, the first of the spatially related payload templates, in a group, may consist of 128 bits taken from the target data, and the second may consist of another sequence of 128 bits that is contiguous in the target data. By segmenting a large payload trigger template into smaller spatially related templates, the SMM attempts to identify with near certainty. This is because the size of payload portion of the packet is not known beforehand, and a large payload trigger template when compared against a smaller payload portion of the packet, a trigger may not occur. Therefore, by comparing payload portion of the packet with a smaller first spatially related payload template, a trigger may occur. When such a trigger occurs with the first template, the SMM compares the payload portion of the sequence with second spatially related payload template and so on. Embodiments of the trigger logic, header templates, and unrelated and spatially related payload templates contained in SMMs, as applicable to an Internet packet, are described with reference to the FIGS. 6, 7 and 8.

Sometimes, a trigger may occur with a partial match, while comparing the payload portion of the packet with the first spatially related payload template. This may happen because the packet in consideration is an arbitrary bit sequence from the target data, the first spatially related payload template may not exactly contain the very same bit sequences, but may at least contain part of the bit sequences. Then, with this partial match, the SMM again compares the payload portion of the packet with the second spatially related payload template, where an exact match identifies the target data with certainty. Functioning of SMM when a partial match occurs is described with reference to the FIG. 16. A pseudo random selection of first spatially related payload template for comparison with payload portion of packets, when a partial or full match occurs is explained with reference to the FIG. 17. Embodiments of construction of spatially related payload trigger templates in accordance with the present invention are explained with reference to the FIGS. 9a, 9b and 10.

Once unrelated and spatially related payload comparison is completed by SMM and trigger logic is applied, the SMMs apply one or more SM processing as indicated in the trigger logic. Choice of a particular SM processing for a given packet depends on the trigger logic and indications in the template. The SMMs may also apply SM processing on a packet, in any of the devices containing SMMs and SMs, if independent request is indicated in the packet. If the SMs indicated in the trigger logic is not available within the device, external SMs may be employed by interrupting the packet routing and sending a copy of the packet to another device, which may contain the required SM. Functional flow of a SM is described with reference to the FIG. 11.

A typical PSE, router, switch, ISPN, AP, server, or end point devices consists of a processing circuitry, network interfaces, and local storage among other blocks. Such embodiments of circuitries are described with reference to the FIGS. 2, 3, 4 and 5. The memory contains one or more of service module managers (SMMs) and local service modules (local SMs). If match occurs while comparing with any one of the trigger templates, the trigger logic indicates one or more of the SM processing to be applied on the packet. If appropriate local SMs are not available, external SMs available in other network devices may be utilized.

The processing circuitry, at the instance of a packet arrival, executes the SMM based on the comparison with the header trigger templates and unrelated and spatially related payload trigger templates, and by running appropriate trigger logic, applies one or more SM processing using the packet. By applying the SM processing, the processing circuitry may take one of the several options available in the SMs, such as interrupting the route forwarding process and returning the packet to the sender. Alternatively, if no match occurs, the processing circuitry may simply perform route processing and forward the packet to a next network device. On the other hand, the processing circuitry may perform route processing, forward the packet to a next network device, also make a copy of the packet, and forward it to another SMM for further analysis.

A simple packet analysis performed by the processing circuitry, for example, by executing SMM using an incoming vectored packet is to compare the header information of an IPv6 packet against trigger lists. If match found, the processing circuitry examines the trigger logic and reconciles multiple matches or multiple trigger logic, if any. If there is no need for any further analysis, such as in case of time sensitive VoIP audio and/or video packets, the processing circuitry performs route processing without packet analysis and forwards the packet. If time sensitivity is not a particular factor, then, the processing circuitry performs full or partial payload correlation. Here, the processing circuitry attempts to correlate payload and signature templates. If again no match found, the packet is route processed and forwarded. If in any one of the template comparisons the processing circuitry finds partial or full match, then the packet is vectored to local and/or remote service modules.

For example, the client device 157 may attempt to download a file from the server 165. The packets (that is, the file to be downloaded) could typically take the pathway of ISPN 127, PSE 108, PSE 111, ISPN 171, AP 173 and finally to the client 157. The packets (from the file to be downloaded) may contain additional independent requests to the SMMs of ISPN 127 (or, PSEs 108 or 111) to apply certain SM processing. For example, if the client device 157, attached to ISPN 171, is from certain region, or certain organization, or for some specific purpose, discard the packets (or send it back to the server 165), or apply some other specific SM processing. This case may occur if the file to be downloaded is not meant for that particular region because of regional customs, any other regional constraints, or language problems. On the other hand, the file requested by the client 157 may not be appropriate for that particular organization. Similar considerations apply during packet analysis, for transfer of inappropriate or destructive data, such as viruses or programs with adult theme, using the Internet infrastructure.

Figure 2:
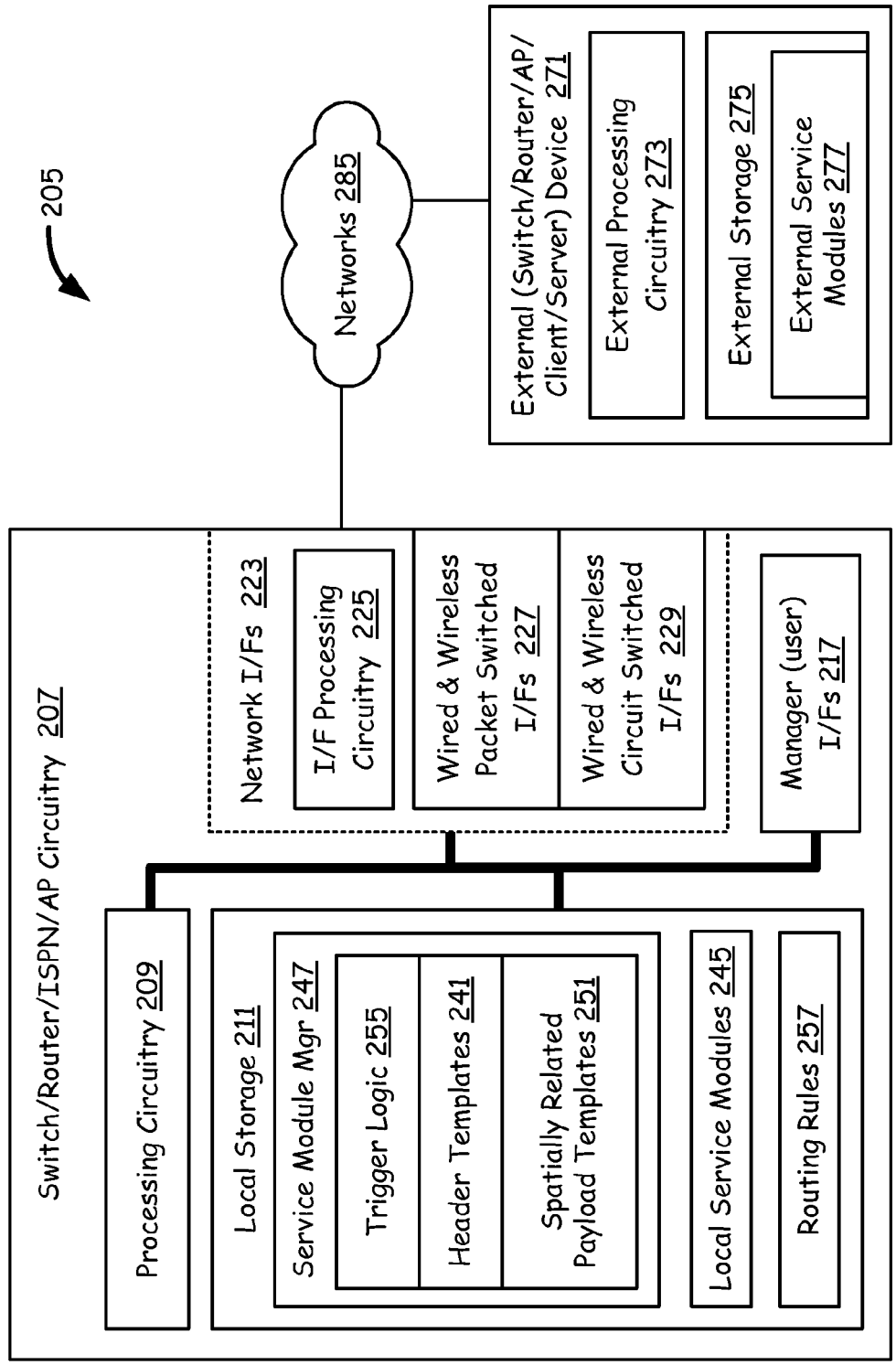
FIG. 2 is a schematic block diagram illustrating a network device (switch/router/ISPN/AP) constructed in accordance with the embodiments of FIG. 1 of the present invention.

FIG. 2 is a schematic block diagram illustrating a network device 207 (switch/router/ISPN/AP) constructed in accordance with the embodiments of FIG. 1 of the present invention. The network device circuitry 207 is circuitry that routes data packets and that is in part or in full incorporated into one or more of the network devices described with reference to the FIG. 1. In specific, network device circuitry 207 may be refer to any of the PSEs 107 through 112, ISPNs 125, 127, 129 and 171, APs 135, 137, 139 and 173, some of the servers 165, 167 and 169 or any other node equipment (not shown). The network device circuitry 207 generally includes processing circuitry 209, local storage 211, manager interfaces 217 and network interfaces 223. These components communicatively coupled to one another via one or more of a system bus, dedicated communication pathways, or other direct or indirect communication pathways. The processing circuitry 209 may be, in various embodiments, a microprocessor, a digital signal processor, a state machine, an application specific integrated circuit, a field programming gate array, or other processing circuitry.

Local storage 211 may be random access memory, read-only memory, flash memory, a disk drive, an optical drive, or another type of memory that is operable to store computer instructions and data. The local storage includes SMM (Service Module Manager) 247 and Local SMs 245 (Service Modules) described in this invention. The SMM 247 further contains trigger logic 255, header and spatially related payload templates 241 and 251 respectively. The header templates 241 and spatially related payload templates 251, which in general may be content templates, in other embodiments may differ to reflect the form of the packets. The local storage 211 also contains routing rules 257, which regulate the flow of the packets.

Further, the network interfaces 223 contain wired and wireless packet switched interfaces 227, wired and wireless circuit switched interfaces 229 and further the network interfaces 223 may also contain built-in or an independent interface processing circuitry 225. The network interfaces 223 allow network devices to communicate with other network devices and allow processing circuitry to utilize external SMs of other network devices, when such SMs are not available in the local storage. The manager interfaces 217 may include a display and keypad interfaces. These manager interfaces allow the user at the network exchanges to control aspects of the trigger templates, the trigger logic and the service modules. In other embodiments, the network device 207 of the present invention may include fewer or more components than are illustrated as well as lesser or further functionality. In other words, the illustrated network device offers one example of possible functionality and construction in accordance with the present invention. Other possible embodiments of network devices are described with reference to the FIGS. 3 and 5, in terms of PSE and AP respectively. The network device 207 is communicatively coupled to external network devices, such as device 271, via networks 285. The external network device 271 may also consist of elements of present invention such as external processing circuitry 273, external storage 275 and external service modules 277.

The SMM 247 compares the header content of the packet against the header templates 241 and similarly, compares the payload field of the packet with the spatially related payload templates 251. If a match is hit, then the SMM 247 executes the trigger logic 255 that are indicated in the corresponding templates. These trigger logic 255 conditional statements direct the processing circuitry 209 to execute appropriate local SMs 245. If an appropriate local SM 245 is not available, external (remote) SMs may be employed. For example, the packet may be encapsulated and forwarded to the external network device 271 with an independent request for the external SMs 277 to be executed. The external processing circuitry 273 then executes external SMs 277 and again encapsulates the packet sends it back to the network device 207. Alternatively, if indicated in the external SMs 277, the packets may be returned to the sender or may be discarded. Note that the trigger logic also contains programs necessary for analysis of packets.

Comparison with spatially related payload templates may involve comparing with a first spatially related payload template in a group of spatially related payload templates, and if a trigger occurs (that is, if a match is found), then compare with the second of the spatially related payload templates, and so on. Each subsequent trigger ensures that the target data is identified and in the end, trigger logic is executed and selected SM processing is applied. Detailed explanation of the functioning of trigger templates and the trigger logic that relates to the current illustration may be found in description with reference to the FIGS. 6, 7, 9a, 9b and 10.

Figure 3:
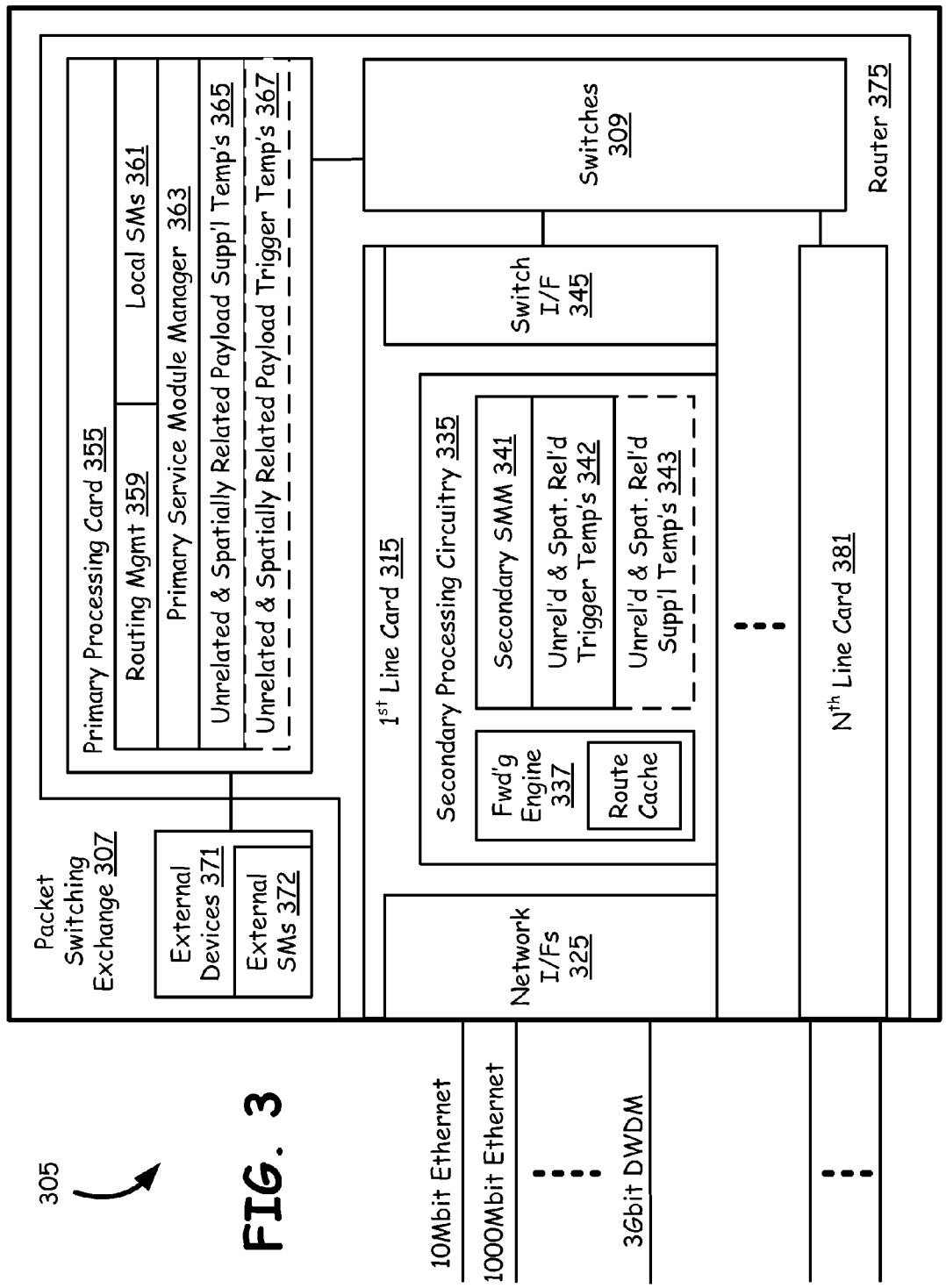
FIG. 3 is a schematic block diagram illustrating a packet switching exchange constructed in accordance with the embodiments of FIG. 1 of the present invention.

FIG. 3 is a schematic block diagram 305 illustrating a packet switching exchange 307 constructed in accordance with the embodiments of FIG. 1 of the present invention. The packet switching exchange circuitry 307 may refer to any of the PSEs 107 through 112 described with reference to the FIG. 1. The PSE circuitry 307 generally includes a router 375 comprising primary processing card 355, switches 309 and plurality line cards 315 and 381. The line cards 315 and 381 may all be different in certain cases. Further, the PSE 307 may also contain external devices 371, such as storage units or user interfaces (not shown). Further, the external devices may contain external service modules 372.

The first line card 315 consists of network interfaces 325 capable of interfacing with wired and wireless networks such as 10 Mbit, 1000 Mbit Ethernet networks and 3 Gbit DWDM (Dense Wavelength Division Multiplexing) fiber optic networks. The first line card 315 also contains switch interfaces 345 that allow the card to interface with interconnecting switches 309. Further, the first line card 315 consists of secondary processing circuitry 335, which preprocesses the packets before interconnecting switches 309 route the packets. The secondary processing circuitry 335 contains forwarding engine 337 and secondary service module manager (SSMM) 341. The SSMM 341 also contain trigger templates such as unrelated and spatially related trigger templates 342 and may contain unrelated and spatially related supplemental templates 343.

The primary processing card 355 further consists of routing management 359, which allows routing of packets and primary service module manager (PSMM) 363. The primary processing card 355 also contain local primary service modules (PSMs) 361. The separation of SMM into primary and secondary SMMs 341 and 363 help speed up the processing and routing of packets. The PSMM also contain content trigger templates such as header trigger templates (not shown) and unrelated and spatially related payload supplemental templates 365 and may contain unrelated and spatially related payload trigger templates 367.

The SSMM 341 preprocesses the packet by comparing the packet content with trigger templates. If a match occurs that can be quickly resolved by applying SSM processing, then such resolution is taken in the secondary processing circuitry 315 itself. Then, the packets may be forwarded to another PSE or ISPN. If further analysis is required, the packets are processed using PSMM 363 and local SMs 361. Detailed explanation of the functioning of trigger templates and the trigger logic that relates to the PSE 307 may be found in description with reference to the FIG. 8.

During the comparison, SSMM 341 compares received packets against unrelated and first of spatially related trigger templates, in a group. If a trigger occurs, the packet is compared with the second of the spatially related trigger templates and so on, until all of the spatially related templates are compared. Thus, irrespective of the packet segmentation of a target data, the target data may be identified using a single packet that arrives at the PSE 307.

Figure 4:
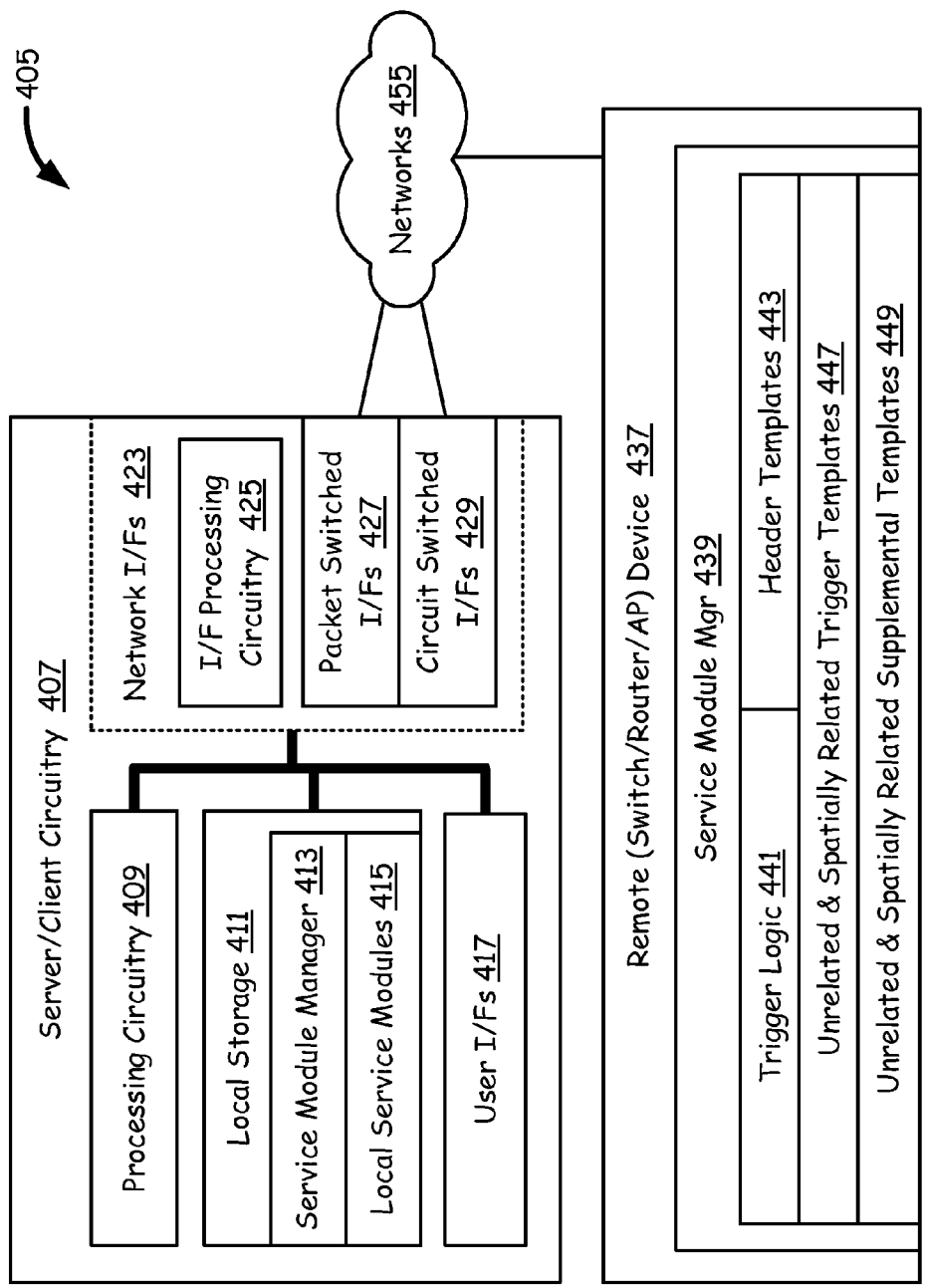
FIG. 4 is a schematic block diagram illustrating end point devices (servers and/or clients) constructed in accordance with the embodiments of FIG. 1 of the present invention.

FIG. 4 is a schematic block diagram 407 illustrating end point devices (servers and/or clients) 407 constructed in accordance with the embodiments of FIG. 1 of the present invention. The server/client circuitry 407 may refer to any of the device circuitry from which packets originate and/or terminate, and the circuitry may in part or full be incorporated in any of the end point devices described with reference to the FIG. 1. In specific, the server/client circuitry 407 may refer to any of the end point devices 151, 153, 155, 157, 159, or 161 described with reference to the FIG. 1.

The server/client circuitry 407 generally includes processing circuitry 409, local storage 411, user interfaces 417 and network interfaces 423. These components communicatively coupled to one another via one or more of a system bus, dedicated communication pathways, or other direct or indirect communication pathways. The processing circuitry 409 may be, in various embodiments, a microprocessor, a digital signal processor, a state machine, an application specific integrated circuit, a field programming gate array, or other processing circuitry.

Further, the network interfaces 423 may contain wired and wireless packet switched interfaces 427, wired and wireless circuit switched interfaces 429 and the network interfaces 423 may also contain built-in or an independent interface processing circuitry 425. The network interfaces 423 allow end point devices to communicate with other end point devices and allow processing circuitry to utilize external SMs of other network devices, when such SMs are not available in the local storage. The user interfaces 417 may include a display and keypad interfaces. The user interfaces 417 allow the user at the end point devices to control aspects of the trigger templates, the trigger logic, and the service modules among other usual user interaction with end point devices. The end point device 407 is communicatively coupled to external network devices, such as device 437, via networks 455. The external network device 437 may also consist of elements of present invention such as SMM 439. The SMM 439 may further consist of trigger logic 441, header templates 443 and unrelated and spatially related payload trigger templates 447 and unrelated and spatially related supplemental templates 449.

Local storage 411 may be random access memory, read-only memory, flash memory, a disk drive, an optical drive, or another type of memory that is operable to store computer instructions and data. The local storage 411 includes SMM (Service Module Manager) 413 and Local SMs 415 (Service Modules) described in this invention, though the SMMs and SMs may exist in a simplified form. The SMM 413 may further contain trigger logic and content templates. In other embodiments, the network device 407 of the present invention may include fewer or more components than are illustrated as well as lesser or further functionality. In other words, the illustrated end point device is meant to merely offer one example of possible functionality and construction in accordance with the present invention.

A server, for example, may employ the SMM 413 to compare the content of the packet against the content templates. If a match occurs, then the SMM 413 executes a trigger logic that is indicated with the match. The trigger logic conditional statements, in turn, direct the processing circuitry 409 to execute appropriate local SMs 415. If an appropriate local SM 415 is not available, external SMs may be employed. Note that the trigger logic may also contain programs necessary for analysis of packets. The SMM 413 incorporated in the client/server circuitry 407 allows prescreening of the packets before they enter the Internet network, where they might undergo further SM processing. Alternatively, the client circuitry may not have a SMM though, but may have several service modules that are accessible to external SMMs residing in servers or network devices when needed.

Figure 5:
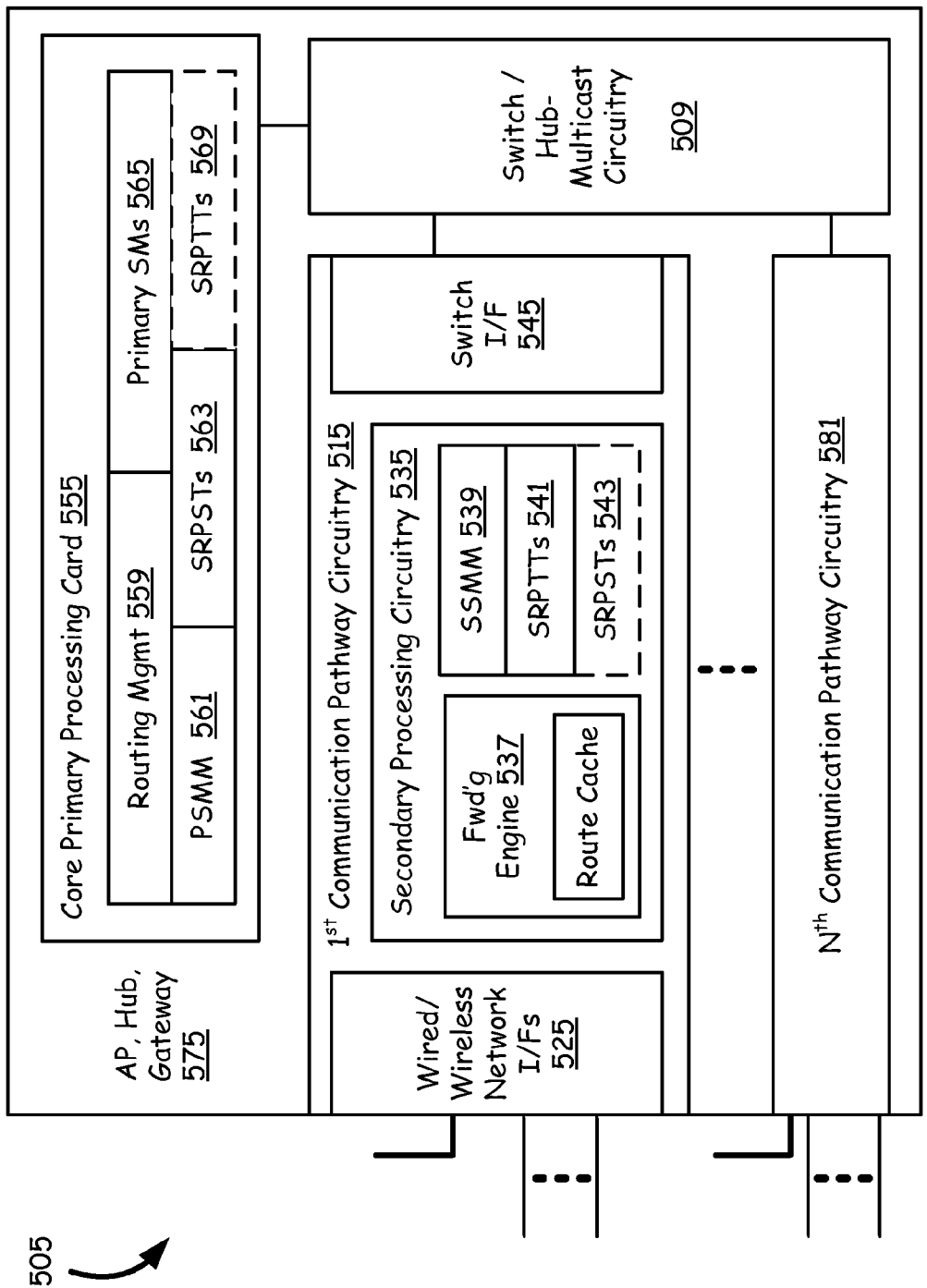
FIG. 5 is a schematic block diagram illustrating an access point, hub or gateway constructed in accordance with the embodiments of FIG. 1 of the present invention.

FIG. 5 is a schematic block diagram 505 illustrating an access point, hub or gateway 575 constructed in accordance with the embodiments of FIG. 1 of the present invention. The access point, hub or gateway circuitry 575 may refer to any of the APs, hub or gateway 135, 139, 137 or 173 described with reference to the FIG. 1. The AP, hub or gateway circuitry 575 generally includes a plurality of communication pathway circuitries such as 515, 581, core primary processing circuitry 555 and switches 509. The communication pathway circuitries such as 515, 581 may all be different in certain cases. The first communication pathway circuitry 515 consists of wired and/or wireless network interfaces 525 capable of interfacing with wired and wireless networks, switch interfaces 545 that allow the card to interface with interconnecting switches 509 and secondary processing circuitry 535.

The secondary processing circuitry 535 preprocesses the packets before interconnecting switches 509 route the packets. The secondary processing circuitry 535 further contains forwarding engine 537 and secondary service module manager (SSMM) 539 and secondary service modules (SSMs—not shown in the Figure). In addition, the SSMM 539 may contain plurality of trigger templates such as header templates (not shown), spatially related payload trigger templates (SRPTTs) 541, spatially related payload supplemental templates (SRPSTs) 543 and unrelated payload trigger templates (not shown). The core primary processing circuitry 555 further consists of routing management 559, which allows routing of packets, primary service module manager (PSMM) 561, primary SMs (local PSMs) 565. In addition, the PSMM 561 may contain plurality of trigger templates such as header templates (not shown), spatially related payload trigger templates (SRPTTs) 541, spatially related payload supplemental templates (SRPSTs) 543 and unrelated payload trigger templates (not shown). The separation of SMM and SMs into primary and secondary SMMs and SMs 539, 541, 561 and 565 help speed up the processing and routing of packets.

As described with reference to the FIG. 3, the SSMM 539 preprocesses the packet by comparing the packet content with trigger templates. For this preprocessing, the SSMM 539 utilizes SRPTTs 541. The first of each group of SRPTTs 541 is compared with payload and if partial and full match is indicated, the second in the group is compared and so on. If a match is confirmed is all of the SRPTTs 541 in a group, SSM processing is applied. Further, if indicated, the packets are vectored to the PSMM 561, and are compared with SRPSTs 563 and if a match is indicated, PSM 565 processing is applied.

In other words, if a match occurs at secondary processing circuitry 535 that can be quickly resolved by applying SSM (not shown) processing, then such resolution is taken in the secondary processing circuitry 535 itself. Then, the packets may be forwarded to another network device. If further analysis is required, the packets are processed using PSMM 561 and local PSMs 565. Detailed explanation of the functioning of trigger templates and the trigger logic that relates to the AP 575 may be found in description with reference to the FIG. 8. The functional details of the current circuitry, specifically, the SSMM 539, SSMs (not shown), PSMM 561, and local PSMs 565 can be found in description with reference to the flowchart in FIGS. 15 through 17.

FIG. 6 is a schematic diagram illustrating an embodiment of trigger logic, header trigger templates and payload trigger templates incorporated into service module managers (SMMs) of FIGS. 2 and 4. In this embodiment, the SMM 600 consists of trigger logic 601, header trigger templates 621, spatially related payload trigger templates 614, header supplemental templates 671 and spatially related payload supplemental templates 685.

Trigger logic 601 consists of reference identifiers (IDs) field 602 and service logic 603. Header trigger templates 621 consists of Ref_IDs (reference IDs) 622, Field IDs 623, comparison templates 624, operator 625 and trigger logic reference IDs (TL_Ref IDs) 626. Similarly, header supplemental templates 671 contain reference IDs 672, field IDs 673, comparison templates 674 and operator 675. Further, the spatially related payload trigger templates 614 contain reference IDs 615, comparison templates 616, operator 617 and TL_Ref IDs 618. Similarly, the spatially related payload supplemental templates 685 contain reference IDs 686, comparison templates 687 and operator 688.

Ref_IDs 602 allow SMM 600 to identify each of the service logic 603 (conditional statements) among many available. Similarly, reference IDs 622, 615, 672 and 686 in the templates allow SMM 600 to identify a template among many available within each of the header trigger templates 621, spatially related payload trigger templates 614, header supplemental templates 671 and spatially related payload supplemental templates 685. The field IDs 623 and 673 in the header trigger templates 621 and header supplemental templates 671 allow SMM 600 to identity the fields in the header of the packet. For example, a typical IPv6 header and extension headers may contain source address, destination address and QoS (Quality of Service) fields, among other fields. The comparison templates 624, 616, 674 and 687 allow SMM 600 to identify the keywords in payload or keywords in header that is to be compared. The operator 625, 617, 675 and 688 are comparative operators that tell SMM 600 how to compare field IDs that refer to a particular content of packets to the comparison templates, for example. For example, the operator 625, 617, 675 and 688 could be equals, not (not equals), greater (greater than) or lesser (lesser than). An example of trigger logic, header trigger templates, header supplemental templates, spatially related payload trigger templates and spatially related payload supplemental templates, the functioning of these, is described with reference to FIG. 7.

FIG. 7 is another schematic diagram illustrating in detail an embodiment of trigger logic, header trigger templates and payload trigger templates of FIG. 6. The SMM 600 of FIG. 6 consisted of trigger logic 601, header trigger templates 621 and 671, and spatially related payload trigger templates 651 and 685. In this illustration, few service logic and few templates are shown, though in reality, there could be many more of service logic and templates. Further, in reality, the trigger logic, header logic and payload logic may be different depending on the packet contents, that is, fields of the packets and the target data that is to be identified.

The trigger logic 701 consists of three service logics 705 707 and 709, referenced by TL_1 through TL_3 704, 706 and 708 respectively. The header trigger templates (HTTs) 721 consists of a Ref_ID, viz., HT_1 728, filed ID 729, comparison template 730, operator field 731, and TL_Ref field 732. Similarly, header supplemental templates (HSTs) 771 contains a Ref_ID, viz., HS_1 776, field ID, viz., Quality of Service (QoS) 777, comparison template, viz., Target QoS Word 778 and operator field 779. Further, spatially related payload trigger templates (SRPTTs) 741 contains four spatially related templates, consisting of Ref_IDs, viz., PT_1 through PT_4 746, 750, 756 and 760, comparison templates 747, 751, 757 and 761, operator fields 748, 752, 758 and 762, and TL_Ref fields, viz., TL_2 through TL_5 749, 753, 759 and 763. Similarly, spatially related payload supplemental templates (SRPSTs) 785 contains three spatially related templates, consisting Ref_IDs, viz., PS_1 through PS_3 786, 790 and 796, comparison templates 787, 791 and 797, and operator fields 788, 792 and 798.

For example of functioning of the SMM 700 in this embodiment, consider a packet containing a segment of target data (restricted material) in the payload, but is all right in every other ways. The SMM 700 at first may verify if there are any matches in the header trigger templates 721. Since, in this example, header information is all right, no matches are found while comparing the packet header contents with the template referenced by 728.

Next, the SMM 700 compares with spatially related payload trigger templates 741. While executing the template referenced by PT_1 746, SR Group A: $1^{st}$ bit sequence template 747 (a keyword that identifies restricted material, for example) is compared with packet payload content. The operator field 748 contains 'equals', that is, the SR Group A: $1^{st}$ bit sequence template 747 is required to match the payload field contents of the packet. Suppose that the SR Group A templates 747 and 751 are the templates that identify some other target data, while SR Group B templates 757 and 762 are meant to identify the target data in consideration. Then, no partial or full match occurs with the above comparison of 747 with payload portion of the packet. Therefore, there is no need to compare with the template 751.

Then, the SMM 700 compares payload portion of the packet with spatially related payload trigger template referenced by PT_3 756. The SR Group B: $1^{st}$ bit sequence template 757 may partially or fully be matched, for a trigger to occur. In this case, the SR Group B: $1^{st}$ bit sequence template 757 may match partially with the payload contents and therefore a trigger occurs. Then, the SMM 700 compares payload potion of the packet with SR Group B: $2^{nd}$ bit sequence template 761 and a match occurs here too. Then, the SMM 700 is directed to the service logic TL_3 709, as indicated in the TL_Ref field 763. The SMM 700 then executes TL_3 708 conditional statement, that is, service logic 709. The conditional statement 709 is '{{If NOT (PS_1 OR PS_2 OR PS_3) then Remote_SM_8}},' that is, if PS_1 OR PS_2 OR PS_3 are not indicated in the match, then execute an external service module SM_8. Therefore, the SMM 700 sends a copy of the packet to an external network device, server or end point device to have the SM_8 service module executed using the packet. The above example describes just one possible circumstance in which a trigger occurs, but there might be innumerable other circumstances where trigger may occur and a process similar to the ones mentioned above may happen.

Figure 8:
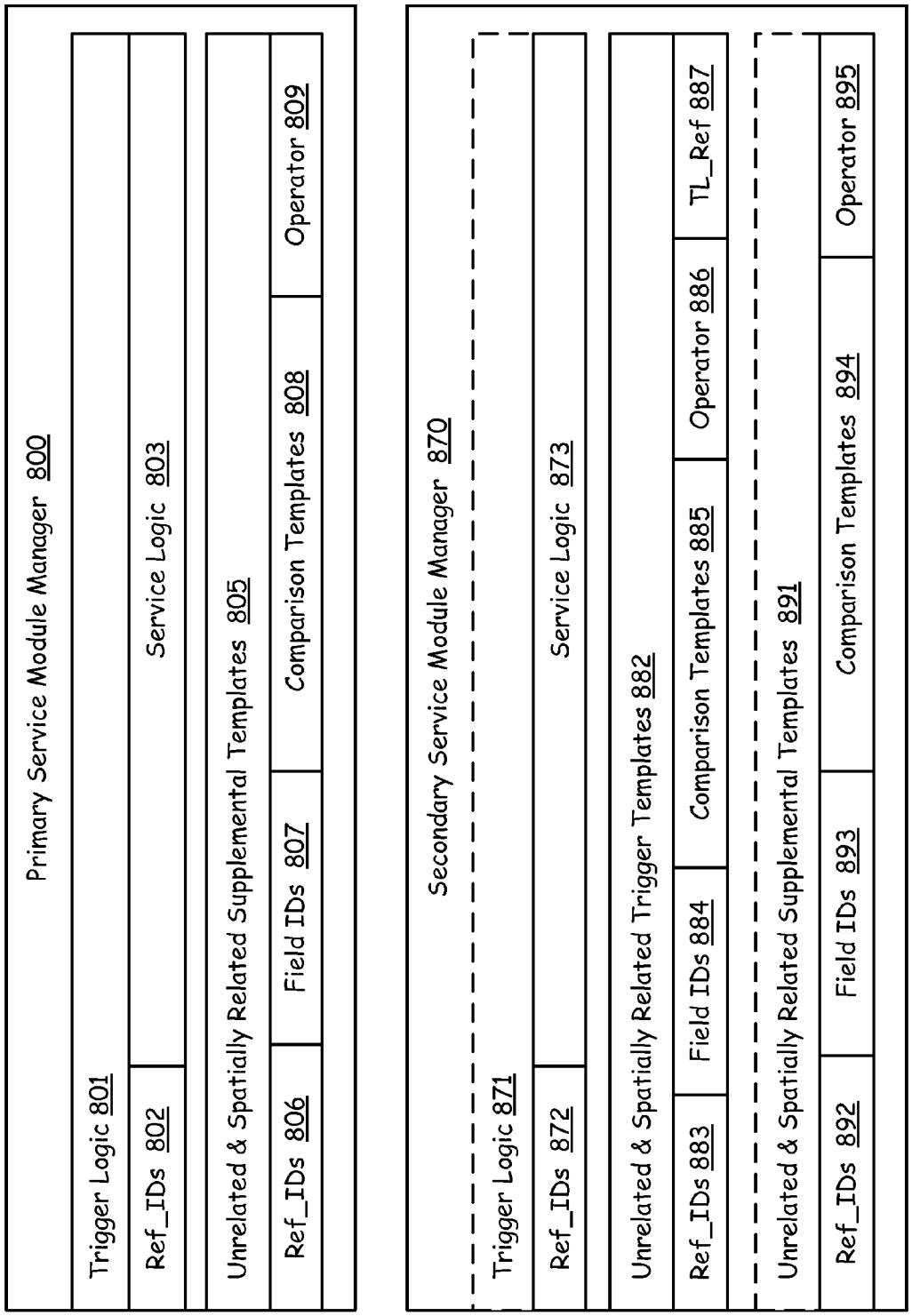
FIG. 8 is another schematic diagram illustrating an embodiment of trigger logic, content templates incorporated into primary and secondary service module managers (SMMs) of FIGS. 3 and 5.

FIG. 8 is another schematic diagram illustrating an embodiment of trigger logic, content templates incorporated into primary and secondary service module managers (SMMs) of FIGS. 3 and 5. In this embodiment, the PSMM 800 consists of trigger logic 801 and unrelated and spatially related supplemental templates 805. Similarly, the SSMM 870 contains unrelated and spatially related trigger templates 882, and may optionally contain trigger logic 871 and unrelated and spatially related supplemental templates 891.

Trigger logic 801 consists of reference identifiers (IDs) field 802 and service logic 803. Unrelated and spatially related supplemental templates 805 consist of Ref_IDs 806, field IDs 807, comparison templates 808 and operator 809. Similarly, unrelated and spatially related trigger templates 882 contain Ref_IDs 883, field IDs 884, comparison templates 885, operator 886 and TL-Ref 887. Further, trigger logic 871 consists of reference identifiers (IDs) field 872 and service logic 873. Finally, unrelated and spatially related supplemental templates 791 contain reference IDs 892, field IDs 893, comparison templates 894 and operator 895. The description of FIGS. 6 and 7 are applicable here as well, in an analogous manner.

Figure 9A:
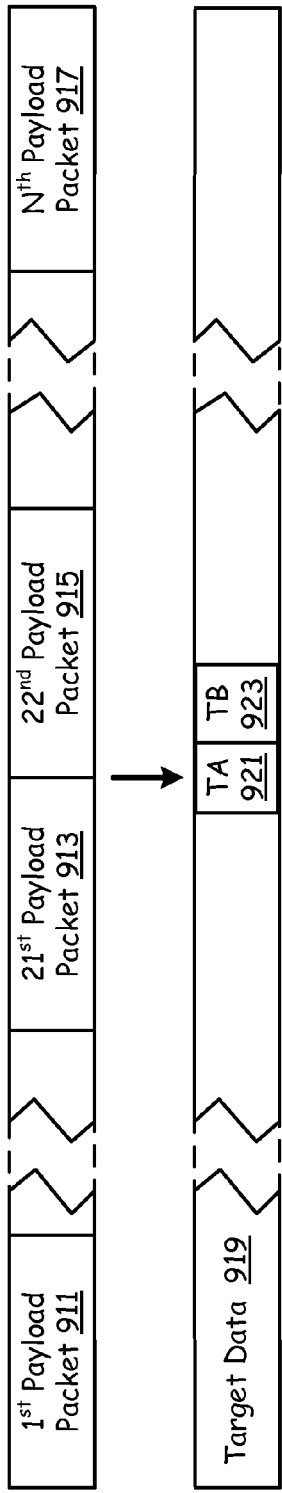
FIGS. 9a and 9b are schematic diagrams illustrating construction of spatially related payload trigger templates that are used to identify a target data with certainty.
Figure 9B:
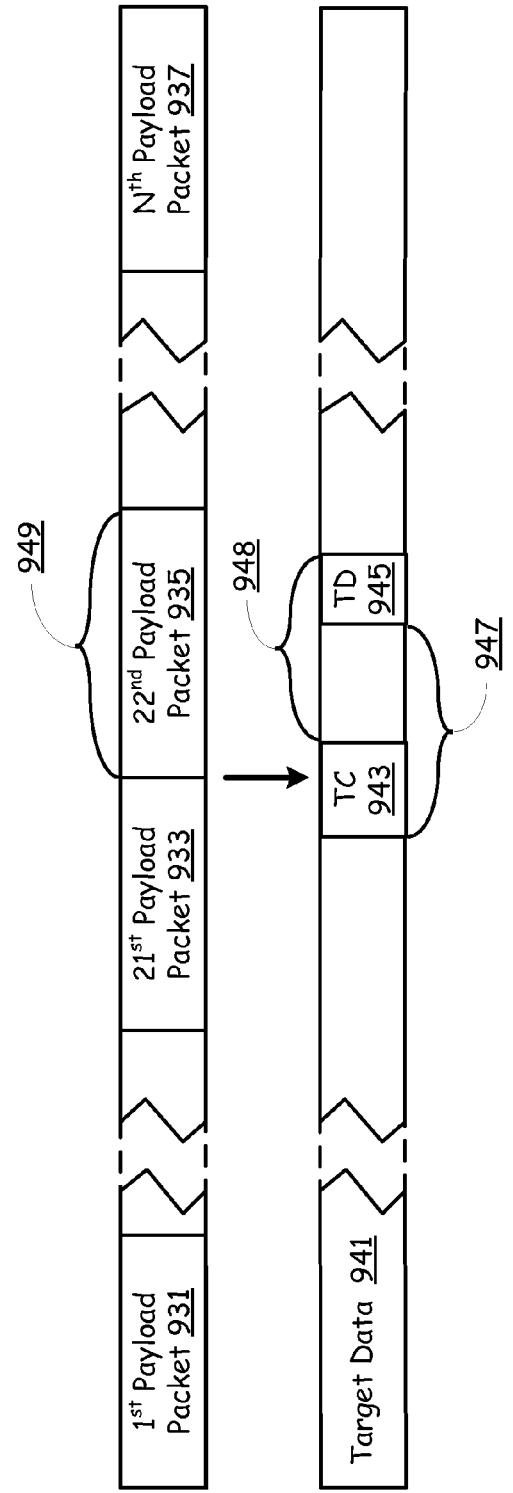

FIGS. 9a and 9b are schematic diagrams illustrating construction of spatially related payload trigger templates that are used to identify a target data with certainty. Referring to the FIG. 9a, a target data is segmented into payload packets such as 911, 913, 915, and 917 by a source end point device, before they are sent to a destination end point device, via network devices. The network devices may contain access points, hubs, gateways, packet switching exchanges, routers, Internet service provider's networks etc. At least some of these network devices incorporate SMM, according to the present invention, and the SMM contain unrelated and spatially related trigger templates, and unrelated and spatially related supplemental templates. One embodiment of construction of such unrelated and spatially related trigger templates, or unrelated and spatially related supplemental templates are illustrated with target data 919, on which comparison template portions TA 921 and TB 923 are superimposed.

For example, the two of the segments of the target data may be the $21^{st}$ payload packet 913 and $22^{nd}$ payload packet 915. The comparison template TA 921 may contain portion of the target data, which do not fully compare either with packet 913 or with packet 915. In this case, while comparing TA 921 with the packet 915, a partial match occurs and subsequently, while comparing with TB 923 a full match occurs. Thus, a guaranteed identification of the target data occurs with at least one payload packet, irrespective of how target data is segmented into packets.

Next, in the FIG. 9b, another possible construction of the unrelated and spatially related trigger templates, or unrelated and spatially related supplemental templates is illustrated. Here, the target data is segmented into payload packets such as 931, 933, 935, and 937 by the source end point device. And the construction of unrelated and spatially related trigger templates, or unrelated and spatially related supplemental templates are illustrated with target data 941, on which comparison template portions TA 943 and TB 945 are superimposed. Here, the comparison templates that identify the target data with certainty are distributed along the packet segment

949. This illustration shows that the two comparison templates need not be continuous.

Figure 10:
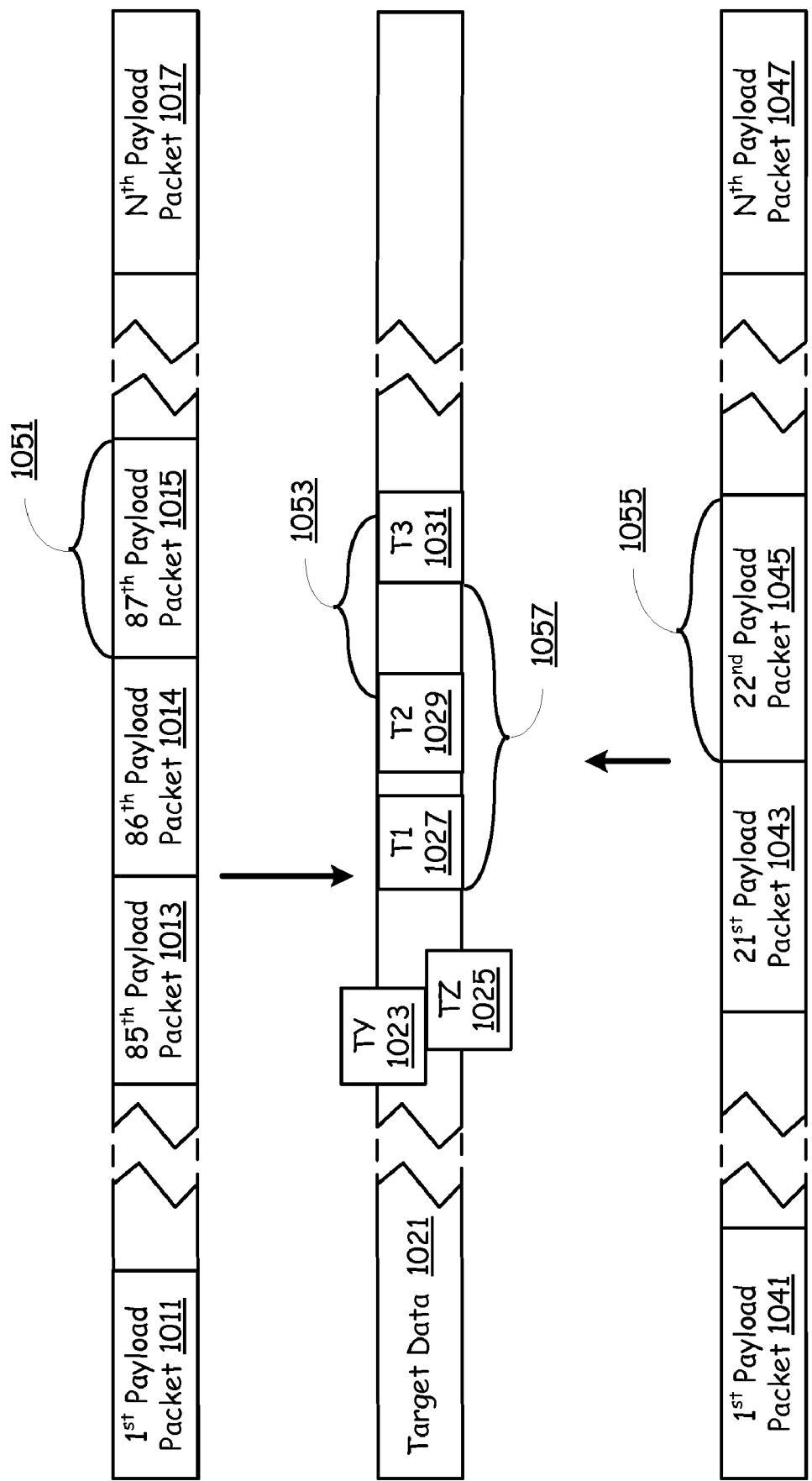
FIG. 10 is another schematic diagram illustrating construction of spatially related payload trigger templates, as another embodiment.

FIG. 10 is another schematic diagram illustrating construction of spatially related payload trigger templates, as another embodiment. The target data is shown being segmented into packets such as $1^{st}$ payload packet 1011, $85^{th}$ payload packet 1013, $86^{th}$ payload packet 1014, $87^{th}$ payload packet 1015 and $N^{th}$ payload packet 1017 in the top, and $1^{st}$ payload packet 1041, $21^{st}$ payload packet 1043, $22^{nd}$ payload packet 1045 and $N^{th}$ payload packet 1047 in the bottom. In the middle, superimposed on the target data 1021 are the comparison templates TY 1023, TZ 1025, T1 1027, T2 1029 and T3 1031. The comparison templates TY 1023 and TZ 1025 overlap on one another, where as the templates T1 1027, T2 1029 and T3 1031 are non-sequential bit sequences that are spatially related.

Figure 11:
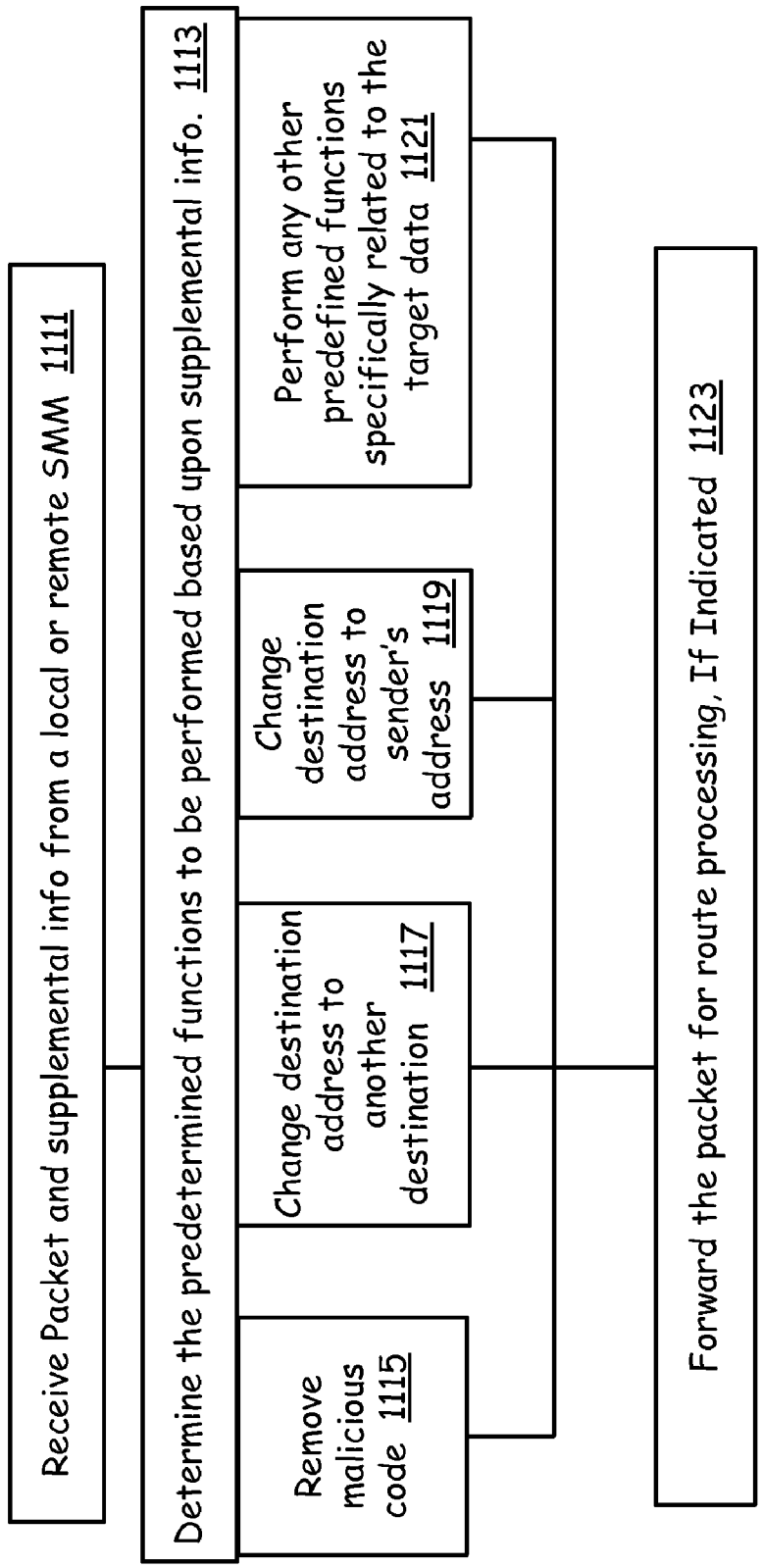
FIG. 11 is a flowchart illustrating general flow of functionality of service modules (SMs)

FIG. 11 is a flowchart 1105 illustrating general flow of functionality of service modules (SMs). At block 1111, the SM receives vectored packet and supplemental information from a local or remote SMM. At a next block 1113, the SM determines the predetermined set of action to be performed on the packet, based upon the supplemental information that accompanies the vectored packet. This flowchart shows four such actions that could be performed at blocks 1115, 1117, 1119 and 1121, though in actuality, there could be many other actions that could be taken by the SM.

At the block 1115, the SM removes malicious code from the segmented packets of the target data, if possible, if not may discard the packet. That is, if the target data is identified as containing concealed disruptive codes such as virus, worms or Trojan horse, by the SMM. In such case, the accompanying supplemental information may contain instructions to remove malicious codes or discard packets if not possible. At the block 1117, the SM changes the destination address to another destination. This may be necessary when it is required for the law enforcement officials to monitor the sources of unrestrained flow of socially unacceptable files or web pages data or packets. In this case, the packets may be redirected to an end point device used by the law enforcement officials.

At the block 1119, the SM changes the destination address to that of the sender. That is, the packet is returned back to the sender. This may be the case when the target data is not acceptable to a certain region. At the block 1121, the SM may perform any other predetermined functions on the packet, which are specifically tailored to the target data. Then, at a next block 1123, the SM forwards the packet for route processing, if indicated.

Figure 12:
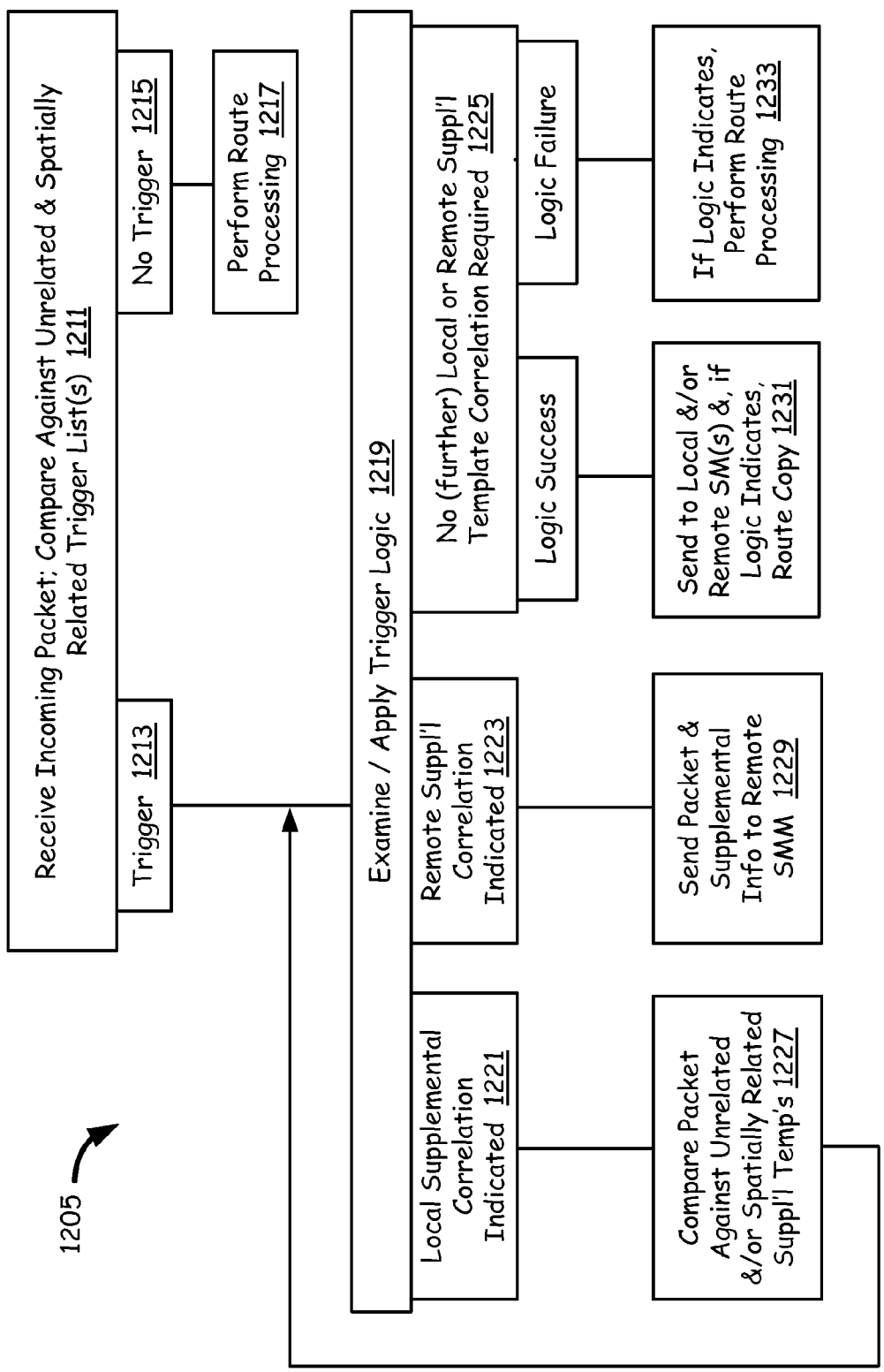
FIG. 12 is a flowchart illustrating flow of events in a service module manager (SMM) that contains spatially related trigger templates.

FIG. 12 is a flowchart 1205 illustrating a flow of events in a service module manager (SMM) that contains spatially related trigger templates. At block 1211, the SMM receives an incoming packet and compares the payload portion of the packet with unrelated and spatially related trigger list(s). If no trigger occurs at a next block 1215, the SMM performs route processing at a next block 1217.

If a trigger is occurs, the SMM examines the trigger logics and applies appropriate trigger logic at a next block 1219. Among the possible course of actions indicated in the trigger logic of the block 1219 are shown at blocks 1221, 1223, and 1225. At the block 1221, the trigger logic indicates local supplemental correlation. If such local supplemental correlation is indicated, at a next block the SMM compares the payload portion of the packet against unrelated and/or spatially related supplemental templates, at a next block 1227. Then, the SMM again examines and applies corresponding trigger logic, at the block 1219.

At the block 1223, the trigger logic indicates remote supplemental correlation. In this case, the SMM sends the packet and supplemental information to a remote SMM for further processing, at a next block 1229. At the block 1225, the trigger logic indicates that no further local or remote supplemental correlation is necessary. Then, if the logic is successful, at a next block 1231, the SMM sends the packet to local and/or remote SM(s) and, if logic indicates, makes a copy of the packet and forwards the packet for route processing. If the logic is failure at the block 1225, at a next block 1233, route processing is performed, if logic indicates.

Figure 13:
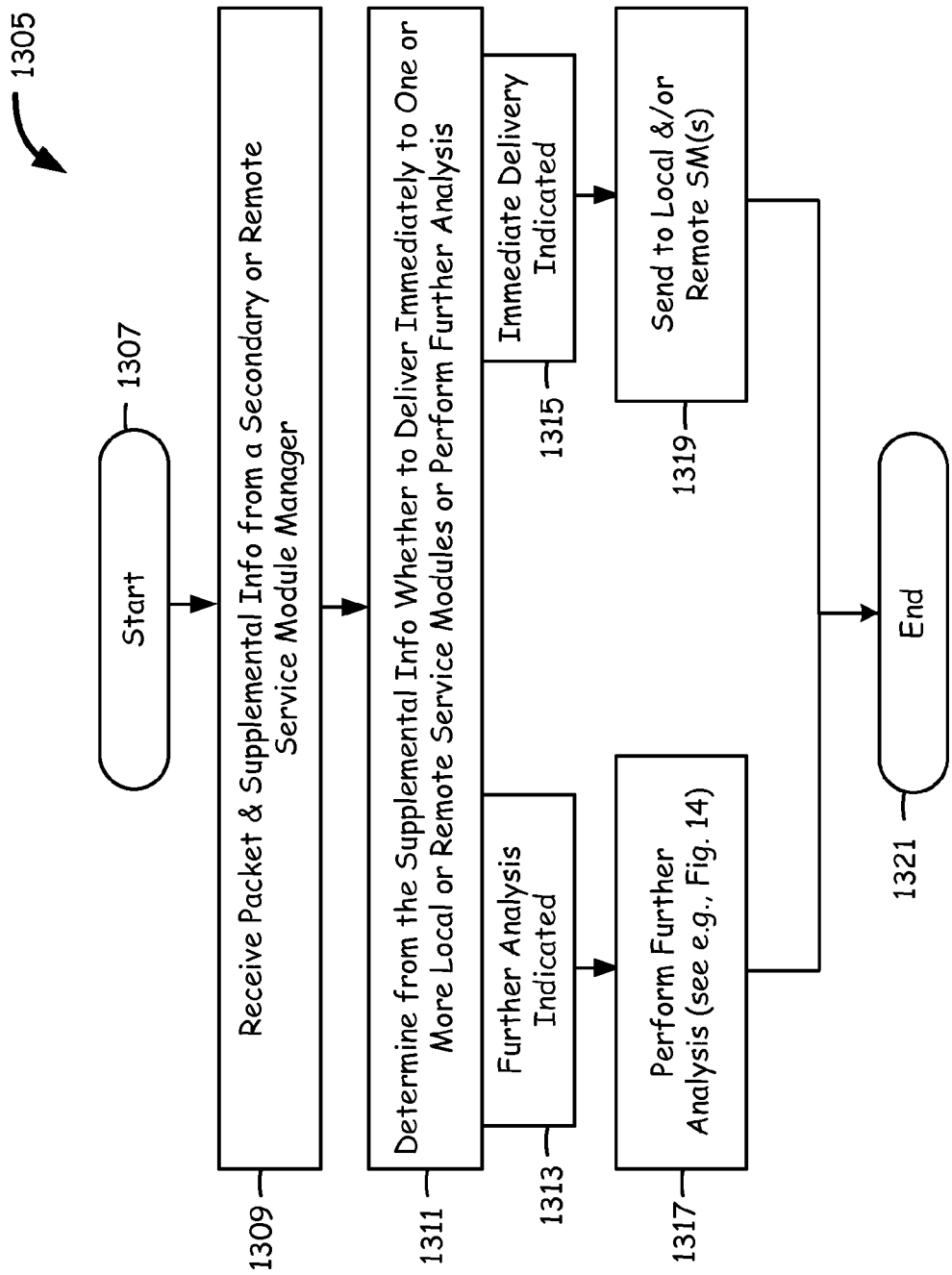
FIG. 13 is another flowchart illustrating the use of supplemental information received with a received packet to determine if packet routing or further analysis is indicated, by a SMM.

FIG. 13 is another flowchart 1305 illustrating the use of supplemental information received with a received packet to determine if packet routing or further analysis is indicated, by a SMM. The flow of use of supplemental information begins at start block 1307. At a next block 1309, the SMM receives packet and supplemental information from a secondary or remote SMM. At a next block 1311, the SMM determines from the supplemental information whether to deliver the packet immediately to one or more of local or remote SM(s) or perform further analysis.

At a next block 1315, an immediate delivery of the packet to one or more of local or remote SM(s) is indicated. Therefore, at a next block 1319, the SMM sends the packet to local and/or remote SM(s). Then, the flow ends at a next block 1321. On the other hand, if further analysis is required at a next block 1313, at a next block 1317, the SMM performs further analysis. The flow of further analysis performed by the SMM is described with reference to the FIG. 14. Then, the flow ends at a next block 1321.

Figure 14:
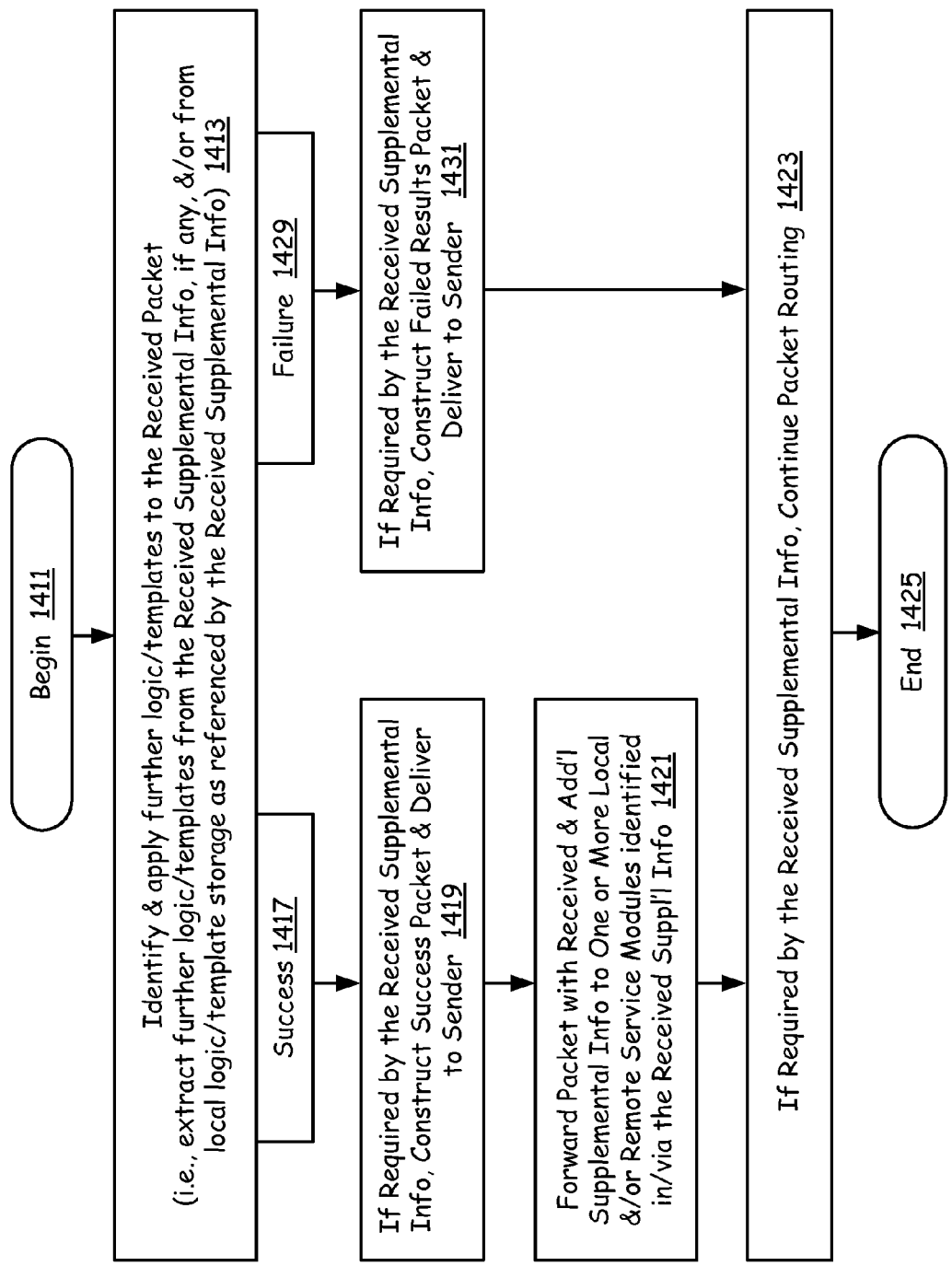
FIG. 14 is another flowchart illustrating the process of further analysis of FIG. 13, by SMM.

FIG. 14 is another flowchart 1405 illustrating the process of further analysis of FIG. 13, by SMM. The process of further analysis begins at a block 1411. At a next block 1413, the SMM identifies and applies further logic/templates to the received packet. That is, extract further logic/templates from the received supplemental information if any, and/or from the local logic/templates storage as referenced by the received supplemental information. The success or failure of identifying and applying further logic/templates is shown in blocks 1417, 1429 respectively.

If the SMM fails to identify and apply further logic/templates at the block 1429, then at a next block 1431, the SMM constructs a failed results packet and sends it to the sender, if required by the received supplemental information. Further, if required by the supplemental information, the SMM continues packet routing at a next block 1423 and the process ends at a next block 1425.

Alternatively, if the identification and the application of further logic/templates are successful at the block 1417, at a next block 1419, the SMM constructs a success results packet and sends it to the sender, if required by the received supplemental information. Then, at a next block 1421, the SMM forwards the packet with received and additional supplemental information to one or more local and/or remote service modules identified in the received supplemental information. Then, if required by the supplemental information, the SMM continues packet routing at a next block 1423 and the process ends at a next block 1425.

Figure 15:
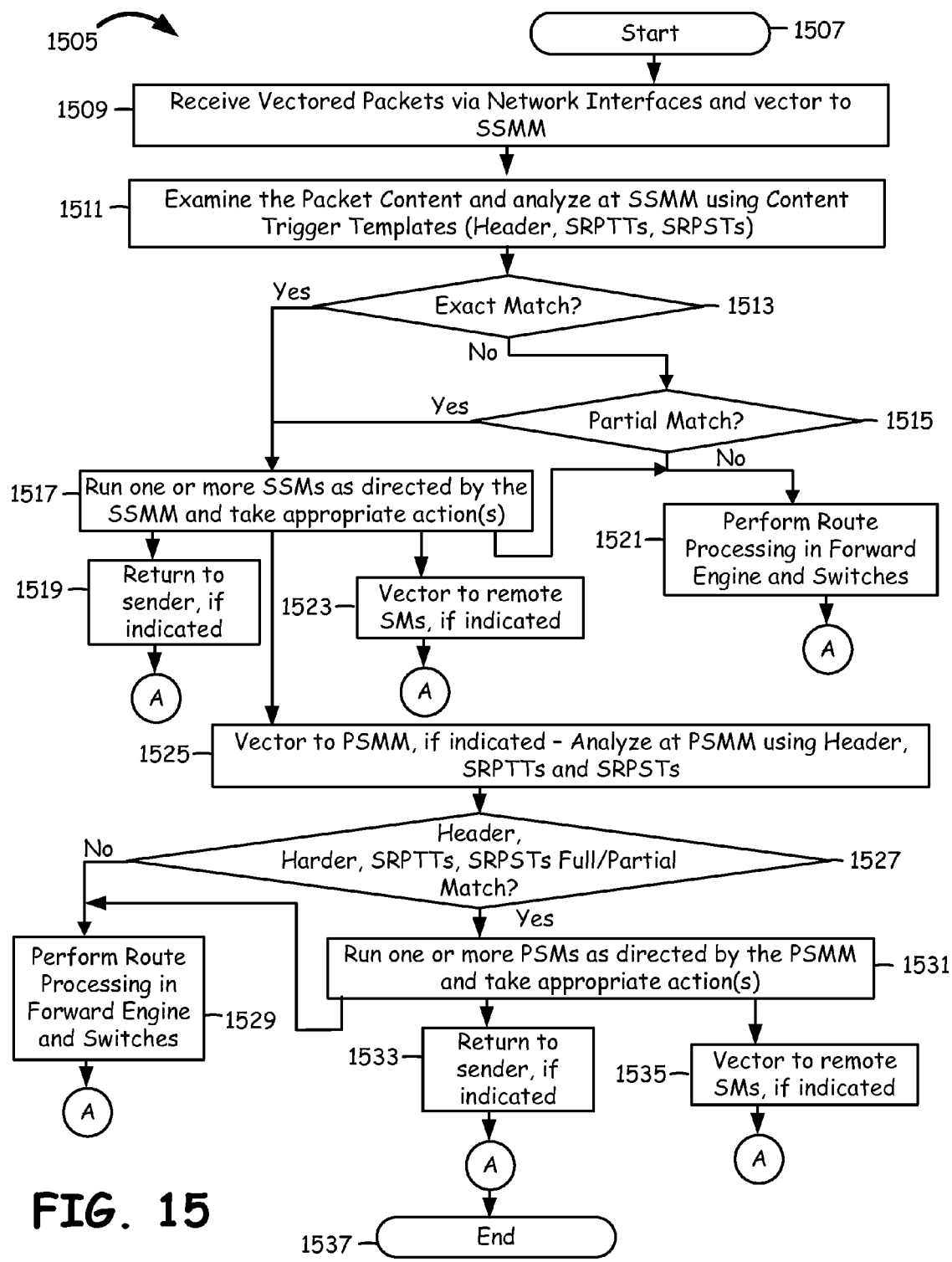
FIG. 15 is a flowchart illustrating detailed flow of functionality of service module managers (SSMM and PSMM) of FIGS. 3 and 5.

FIG. 15 is a flowchart 1505 illustrating detailed flow of functionality of service module managers (SSMM and PSMM) of FIGS. 3 and 5, in accordance with the present invention. The method described here refers to a particular embodiment; it may differ when considering other embodiments. The method begins at start block 1507. At a next block 1509, the secondary processing circuitry receives vectored packets via network interfaces and vectors the packet to the SSMM. At next block 1511, the SSMM examines the packet and executes SSMM using content trigger templates. That is, a comparison is made between the various fields of the packet with that of the content trigger templates at the SSMM. The content trigger templates may include header templates, spatially related payload trigger templates and spatially related payload supplemental templates.

Then at a next decision block 1513, the SSMM decides if there is any exact match in the comparison. Then at another decision block 1515, if there is any partial match, in the comparison, is verified. At a next block 1517, if there is partial or exact match at blocks 1513 and 1515, the SSMM executes one or more secondary service modules (SSMs) as indicated in the trigger logic of the SSMM and takes appropriate actions as directed by the SSMs. If there is no trigger logic in the SSMM, the packets may be vectored to the PSMM for further analysis. Further, in the block 1517, the SSM processing for exact match and partial match may be different in certain cases. If there is neither exact match nor partial match at the decision blocks 1513 and 1515, then at a next block 1521, the secondary processing circuitry performs route processing using the forwarding engine, switches, and forwards the packet to the next node. The method ends at a next end block at 1537.

At block 1519, one of the actions taken is to return to the sender, if indicated in the SSM. Then, the process ends in the end block at 1537. At block 1523, another of the actions taken is to make a copy or vector the packet without making a copy to a remote network device, for application of remote SM processing. The packet may be forwarded from the remote network device directly to the destination or may be vectored back to the device in consideration for further processing. Then the method ends at the next block 1537. Once appropriate SSM processing is done in the block 1517, another of the actions taken by the SSSM is to perform route processing using the forwarding engine, switches, and forwards the packet to the next node, at the block 1521. Then, the method ends at the end block at 1537. One of the actions that might be taken, at a next block 1525, is to vector the packet to PSMM for further analysis, if indicated. The further analysis includes comparison with header templates, spatially related payload trigger templates and spatially related payload supplemental templates that exist in the PSMM.

Then, at a next decision block 1527, the PSMM verifies if there are any partial of full match with header, extension header and/or content supplemental trigger templates. If no full or partial matches, at a next block 1529, the PSMM performs route processing using the forwarding engine, switches, and forwards the packet to the next node. The method ends at the end block at 1537. At a next block 1531, if there is partial or full match at the block 1527, the PSMM executes one or more primary service modules (PSMs) as indicated in the trigger logic of the PSMM and takes appropriate actions as directed by the PSMs or the trigger logic.

At block 1533, one of the actions taken is to return to the sender, if indicated in the PSM. Then, the process ends in the end block at 1537. At block 1535, another of the actions taken is to make a copy or vector the packet without making a copy to a remote network device, for application of remote SM processing. Again, the packet may be forwarded from the remote network device directly to the destination or may be vectored back to the device in consideration for further processing. Then the method ends at the next block 1537. Once appropriate PSM processing is done in the block 1531, another of the actions taken by the primary processing circuitry is to perform route processing using the forwarding engine, switches, and forwards the packet to the next node, at the block 1529. Then, the method ends at the end block at 1537.

Figure 16:
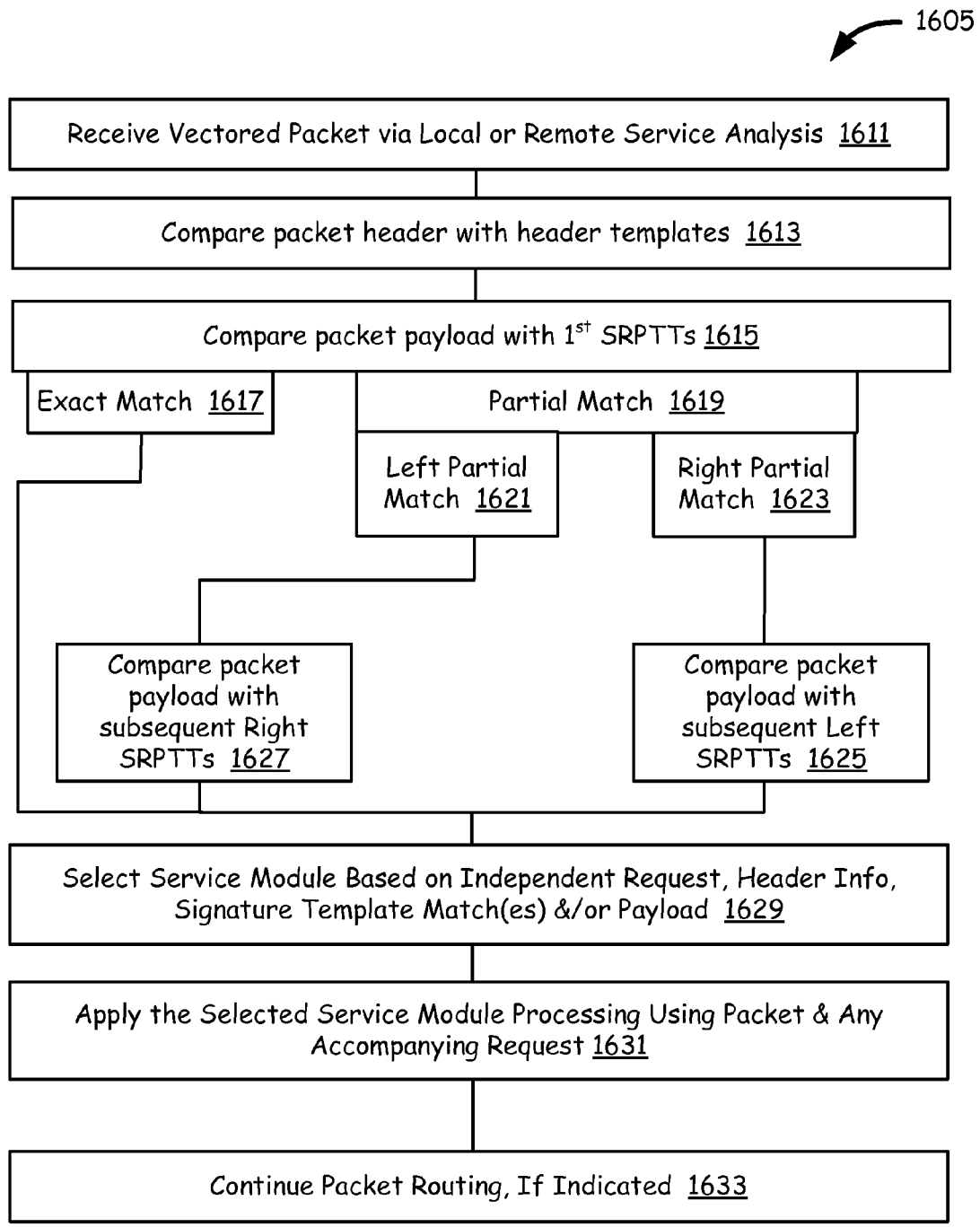
FIG. 16 is a flowchart illustrating an embodiment of functionality of service module managers in which a partial match occurs while comparing the packet payload with spatially related payload trigger templates (SRPTTs)

FIG. 16 is a flowchart 1605 illustrating an embodiment of functionality of service module managers in which a partial match occurs while comparing the packet payload with spatially related payload trigger templates (SRPTTs). In this embodiment, the SMM considers successful partial match at the left end or right end of the payload portion of the packet and the subsequent spatially related payload trigger template comparisons. At a block 1611, the SMM receives vectored packet via local or remote service analysis. Then, at a next block 1613, header template comparisons are performed. Then, at a next block 1615, the SMM compares payload portion of the packet with SRPTTs, starting from the first template of the first group.

At a next block 1619, a partial match occurs. If the partial match is left partial at a block 1621, that is the match occurs somewhere in the beginning of the payload portion of the packet, then the subsequent spatially related payload trigger templates compared are right SRPTTs, at the next block 1627. Alternatively, if the partial match is right partial at a block 1623, that is the match occurs somewhere in the ending of the payload portion of the packet, then the subsequent spatially related payload trigger templates compared are left SRPTTs, at the next block 1625.

At a next block 1629, the SMM selects service modules based on independent requests, header information, signature template match(es) and/or payload, as indicated in the trigger logic. Then, at a next block 1631, selected local or remote SM processing is applied using the packet and any accompanying requests. Then, the SMM continues packet routing, if indicated, at a next block 1633. Alternatively, if an exact match occurs at a next block 1617, then each of the subsequent SRPTTs is compared and then the steps of blocks 1629, 1631, and 1633 are followed.

Figure 17:
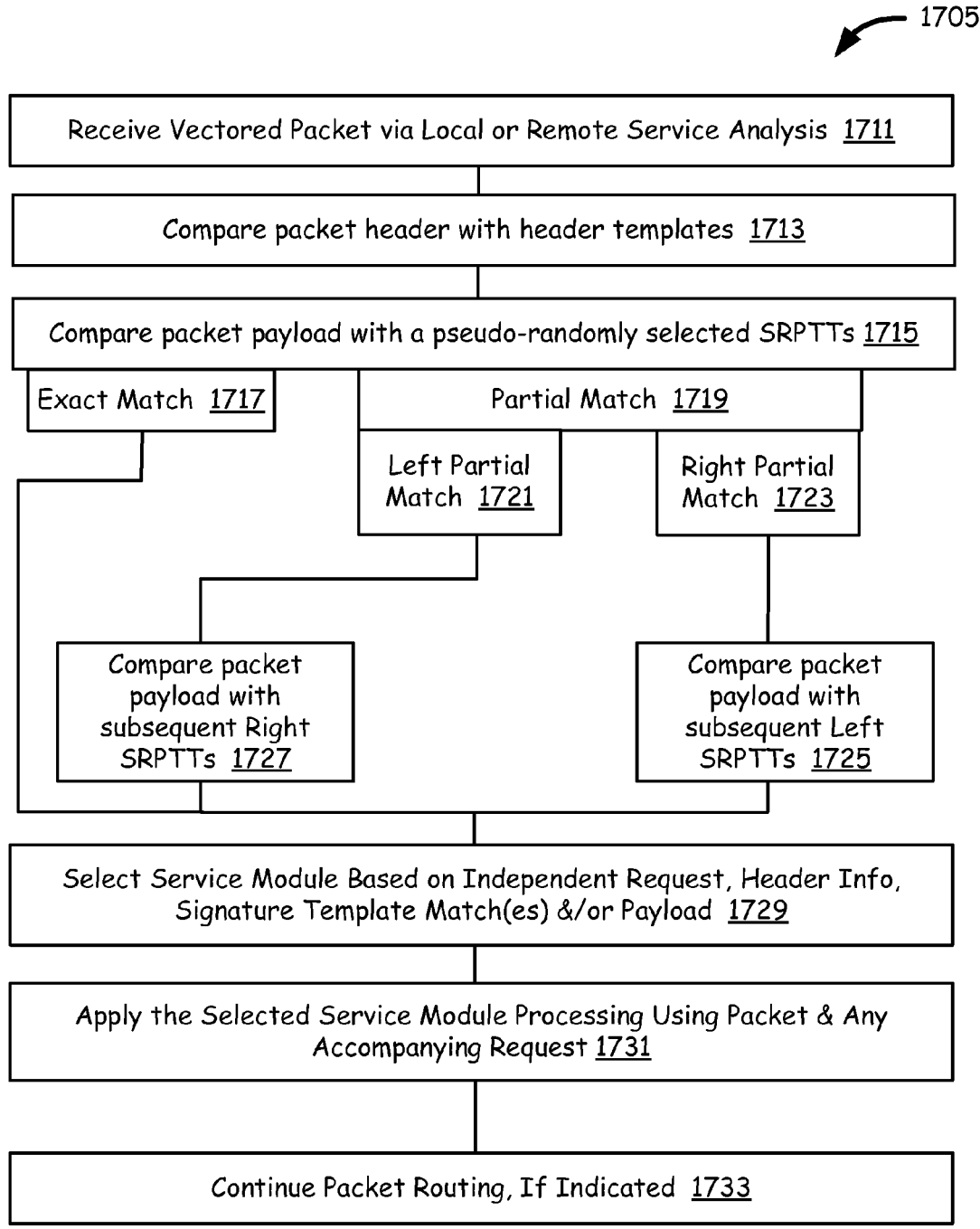
FIG. 17 is a flowchart illustrating another embodiment of functionality of service module managers in which pseudo randomly segmented spatially related payload trigger templates (SRPTTs) are used.

FIG. 17 is a flowchart 1705 illustrating another embodiment of functionality of service module managers in which pseudo randomly segmented spatially related payload trigger templates (SRPTTs) are used. In this embodiment, the SMM considers successful partial match at the left end or right end of the payload portion of the packet based upon pseudorandom spatially related payload trigger template comparisons. At a block 1711, the SMM receives vectored packet via local or remote service analysis. Then, at a next block 1713, header template comparisons are performed. Then, at a next block 1715, the SMM compares payload portion of the packet with a pseudo-randomly selected SRPTTs, starting from the first template of the group.

At a next block 1719, a partial match occurs. If the partial match is left partial at a block 1721, that is the match occurs somewhere in the beginning of the payload portion of the packet, then the subsequent spatially related payload trigger templates compared are right SRPTTs, at the next block 1727. Alternatively, if the partial match is right partial at a block 1723, that is the match occurs somewhere in the ending of the payload portion of the packet, then the subsequent spatially related payload trigger templates compared are left SRPTTs, at the next block 1725.

At a next block 1729, the SMM selects service modules based on independent requests, header information, signature template match(es) and/or payload, as indicated in the trigger logic. Then, at a next block 1731, selected local or remote SM processing is applied using the packet and any accompanying requests. Then, the SMM continues packet routing, if indicated, at a next block 1733. Alternatively, if an exact match occurs at a next block 1717, then each of the subsequent SRPTTs is compared and then the steps of blocks 1729, 1731 and 1733 are followed.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A network device comprising:
    a plurality of packet switched interface circuits, a first of the plurality of packet switched interface circuits receives a segmented video packet;
    local storage comprising a first template and a second template representing different segments of a trigger template, the trigger template including an identifiable bit sequence corresponding to malware, the first template corresponding to a first portion of the trigger template, the second template corresponding to a second portion of the trigger template, the first template and the second template being related to compensate for segmentation of the segmented video packet; and
    processing circuitry, communicatively coupled to each of the plurality of packet switched interfaces and to the local storage, compares the segmented video packet with the first template and the second template and:
    based on a first comparison result, initiates malware detection processing operations; and
    based on a second comparison result, initiates forwarding of the segmented video packet via at least one of the plurality of packet switched interface circuits.

2. The network device of claim 1, wherein the malware detection processing operations include initiating execution of a selected local service module of a plurality of local service modules for malware processing.

3. The network device of claim 1, wherein the malware detection processing operations include removing malicious code from the segmented video packet.

4. The network device of claim 1, wherein the malware detection processing operations include:
    altering a destination address of the segmented video packet; and
    forwarding of the segmented video packet via at least one of the plurality of packet switched interface circuits.

5. The network device of claim 1, wherein the malware detection processing operations include:
    altering a destination address of the segmented video packet to a sender's address; and
    returning the segmented video packet via at least one of the plurality of packet switched interface circuits to the sender's address.

6. The network device of claim 1, wherein the malware detection processing operations include performing a supplemental correlation of the segmented video packet to at least one supplemental template.

7. The network device of claim 1, wherein the malware detection processing operations include enabling a service module for additional processing of the segmented video packet.

8. The network device of claim 1, wherein the segmented video packet comprises at least a portion of a header of video data.

9. The network device of claim 1, wherein the segmented video packet comprises at least a portion of payload of video data.

10. The network device of claim 1, wherein the segmented video packet comprises:
    at least a portion of a header of video data; and
    at least a portion of payload of the video data.

11. A method for operating a network device comprising:
    receiving a segmented video packet via a first one of a plurality of packet switched interface circuits;
    comparing, by processing circuitry, the segmented video packet with a first template and a second template representing different segments of a trigger template, the trigger template including an identifiable bit sequence corresponding to malware, the first template corresponding to a first portion of the trigger template, the second template corresponding to a second portion of the trigger template, the first template and the second template being related to compensate for segmentation of the segmented video packet, and:
    upon on a first comparison result, initiating malware detection processing operations; and
    upon on a second comparison result, initiating forwarding of the segmented video packet via at least one of the plurality of packet switched interface circuits.

12. The method of claim 11, wherein initiating the malware detection processing operations comprises initiating execution of a selected local service module of a plurality of local service modules for malware processing.

13. The method of claim 11, wherein initiating the malware detection processing operations comprises removing malicious code from the segmented video packet.

14. The method of claim 11, wherein initiating the malware detection processing operations comprise:
   altering a destination address of the segmented video packet; and
   forwarding of the segmented video packet via at least one of the plurality of packet switched interface circuits.

15. The method of claim 11, wherein initiating the malware detection processing operations comprise:
   altering a destination address of the segmented video packet to a sender's address; and
   returning the segmented video packet via at least one of the plurality of packet switched interface circuits to the sender's address.

16. The method of claim 11, wherein initiating the malware detection processing operations comprises performing a supplemental correlation of the segmented video packet to at least one supplemental template.

17. The method of claim 11, wherein initiating the malware detection processing operations comprises enabling a service module for additional processing of the segmented video packet.

18. The method of claim 11, wherein the segmented video packet comprises at least a portion of a header of video data.

19. The method of claim 11, wherein the segmented video packet comprises at least a portion of payload of video data.

20. The method of claim 11, wherein the segmented video packet comprises:
   at least a portion of a header of video data; and
   at least a portion of payload of the video data.

* * * * *